(12) United States Patent
Breitscheidel et al.

(10) Patent No.: US 7,337,913 B2
(45) Date of Patent: Mar. 4, 2008

(54) SINGLE PIECE CLOSURE DEVICE MADE OF PVC

(75) Inventors: Boris Breitscheidel, Limburgerhof (DE); Gerhard Olbert, Dossenheim (DE); Klaus Rossato, Schifferstadt (DE); Uwe Storzum, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/502,710

(22) PCT Filed: Jan. 29, 2003

(86) PCT No.: PCT/EP03/00900

§ 371 (c)(1),
(2), (4) Date: Jul. 29, 2004

(87) PCT Pub. No.: WO03/064512

PCT Pub. Date: Aug. 7, 2003

(65) Prior Publication Data

US 2005/0106405 A1    May 19, 2005

(30) Foreign Application Priority Data

Jan. 29, 2002   (DE) ................ 102 03 386

(51) Int. Cl.
*B65D 39/08* (2006.01)
*B65D 39/00* (2006.01)

(52) U.S. Cl. .............. 215/355; 215/356; 524/296; 524/297; 524/469

(58) Field of Classification Search .......... 215/316, 215/355–356, 349; 524/285, 569, 296–297
See application file for complete search history.

(56) References Cited

U.S. PATENT DOCUMENTS 2,072,536 A * 3/1937 Trickey et al. ............. 215/349
2,698,436 A * 1/1955 Bernhardt .................. 623/7
3,296,180 A   1/1967 Raether et al.
3,836,333 A * 9/1974 Mintz ....................... 422/73
4,230,231 A   10/1980 Burnett et al.
4,364,486 A   12/1982 Korte et al.
5,317,047 A   5/1994 Sabate et al.
5,904,965 A   5/1999 Noel et al.
6,284,917 B1 * 9/2001 Brunner et al. ........... 560/127

FOREIGN PATENT DOCUMENTS

| DE | 200 21 356 | * 3/2001 |
| DE | 200 21356 | 3/2001 |
| EP | 629 559 | 12/1994 |
| GB | 724364 | 2/1955 |
| GB | 1092987 | 11/1967 |
| JP | 2001-207002 | * 7/2001 |
| WO | 98/47783 | 10/1998 |
| WO | 99/01354 | 1/1999 |
| WO | 00/23259 | 4/2000 |

OTHER PUBLICATIONS

Derwent Abstract EP 629559, Dec. 21, 1994.
Engl. Abst. DE 20021356, Feb. 22, 2001.

* cited by examiner

*Primary Examiner*—Peter Szekely
(74) *Attorney, Agent, or Firm*—Novak Druce + Quigg LLP

(57) ABSTRACT

The present invention relates to one-part closure devices encompassing at least polyvinyl chloride and at least one plasticizer, in particular at least one substituted or unsubstituted cyclohexanedicarboxylic acid or a derivative thereof, to a process for producing a closure device of this type, and also to the use of a closure device of the invention as a closure for containers, in particular for wine bottles or other bottles.

18 Claims, No Drawings

SINGLE PIECE CLOSURE DEVICE MADE OF PVC

The present invention relates to one-part closure devices, encompassing at least polyvinyl chloride and at least one plasticizer, in particular at least one substituted or unsubstituted a derivative thereof, to a process for producing a closure device of this type, and also to the use cyclohexanedicarboxylic acid or of a closure device of the invention as a closure for containers, in particular for wine bottles or other bottles.

Various synthetic closure devices are known from the prior art, for example, EPA 0 629 559 describes multipart synthetic stoppers with a polyethylene base, composed of a base whose ends or interior comprise(s) a barrier layer made from a microfilter laminate, where the barrier layer inhibits gas exchange between the bottle contents and the external atmosphere, and is impermeable to the liquid in the interior of the bottle. The stopper described in EP-A 0 629 559 can optionally have a helical recess which facilitates the application of a corkscrew. U.S. Pat. No. 4,364,486 also mentions a stopper of complex structure with a helical recess for the application of a corkscrew, for use as a bottle closure.

Other multipart closure devices described in the prior art are in particular stoppers made from more than one material. For example, WO 00/56526 describes an extruded and foamed synthetic stopper composed of more than one component and of more than one layer, as a closure for bottles. WO 98/47783, too, describes an extruded and foamed synthetic stopper composed of more than one component and layers, as a closure for bottles. According to WO 98/47783, multilayer stoppers of this type may also have a core made from a polymer based on a vinyl resin.

GB 1092987 relates to corks based on a mixture of natural cork and foamed polyurethane which has been impregnated with a polyurethane resin, and WO 99/01354 discloses synthetic corks composed of a rigid plastic cap and a shaft made from a thermoplastic elastomer, as a reusable closure for bottles. WO 00/23259 moreover says that synthetic stoppers may also comprise color concentrates, sinusoidal streaks of which run through the stopper in order to give the synthetic stopper a cork-like appearance.

A disadvantage of the closures described in the prior art is that the desired properties, such as barrier action with respect to gases, can only be achieved if the closures are composed of more than one component and/or more than one layer. The production of closures of such complex structure is complicated and expensive, and stepless adjustment of the desired properties is difficult.

It is an object of the present invention, therefore, starting from the prior art to provide one-part closures which are intended for containsrs, in particular for wine bottles, and which are composed of a material which can be produced simply at low cost, and in which it is possible to adjust properties, in particular barrier action with respect to gases, as desired by way of the composition of the material and the conditions of production.

We have found that this object is achieved by means of one-part closure devices encompassing at least polyvinyl chloride and at least one plasticizer.

Surprisingly, it has been found that closure devices of this type encompassing a polyvinyl chloride, at least one substituted or unsubstituted cyclohexanedicarboxylic acid or a derivative thereof as plasticizer, and, where appropriate, other additives, have very good suitability as closures for containers, in particular for wine bottles. The one-part closure devices of the invention can be produced simply and at low cost. Stepless adjustment of the properties of the closure devices of the invention, in particular barrier action with respect to gases, is possible by way of the production conditions and the composition of the material, especially by way of the nature and content of plasticizer.

For the purposes of the present invention, a closure device is a closure suitable for sealing a container, for example a screw closure or a stopper. For the purposes of the present invention, a one-part closure device is a closure device which is composed of the same material throughout, i.e. not of various layers, nor of components of different materials.

In one preferred embodiment, the present invention provides a one-part closure device which is a closure stopper.

For the purposes of the present invention, a plasticizer is a substance which reduces the hardness of polyvinyl chloride in the mixture of the invention.

The closure devices of the invention can be produced simply and at low cost. Properties can be adjusted as desired by way of the composition of the closure device, in particular by way of the nature and content of the plasticizer. A first important factor is adequate compressibility and elasticity of the closure device, in particular if the closure device is a stopper, the aim being that while these are easy to introduce into the apertures of the bottles they nevertheless provide leakproof sealing of the same. A factor of particular importance is the barrier action of the closure device with respect to gases, e.g. carbon dioxide, sulfur dioxide, and oxygen. For example, in the case of sparkling wine it is desirable that no gas exchange takes place between the interior of the bottle and the environment. White wine tolerates only minimal gas exchange, whereas red wine needs a certain level of gas exchange to achieve maturity. The closure devices of the invention permit stepless adjustment as desired of gas permeability by way of the production conditions and the composition, in particular by way of the nature and content of the plasticizer.

The plasticizers used may in principle be any of the compounds known to the skilled worker which plasticize PVC. Examples of these include the plasticizers described in L. Meier "Weichmacher für PVC" in Becker/Braun Kunststoffhandbuch, Volume 2/1: Polyvinylchlorid, Carl Hanser Verlag Munich/Vienna 1986. For the purposes of the present invention it is also possible to use a mixture of two or more of these plasticizers.

Specific suitable plasticizers are cyclohexanedicarboxylic acids or derivatives of these; phthalates, such as dibutyl phthalate, diisobutyl phthalate, benzyl butyl phthalate, dipentyl phthalate, di(2-ethylhexyl) phthalate, diisooctyl phthalate, dicapryl phthalate, di-n-octyl phthalate, dialphanyl phthalte, di-n-alkyl (Alfol 610) phthalate, di-n-alkyl (Alfol 810) phthalate, di-n-alkyl (79) phthalate, di-n-alkyl (711) phthalate, di-n-alkyl (911) phthalate, diisononyl phthalate, diisodecyl phthalate, diisoundecyl phthalate, diisotridecyl phthalate and dimethoxyglycol phthalate; epoxy plasticizers, such as epoxidized soybean oil, epoxidized linseed oil, 2-ethylhexyl epoxytallate, and diisodecyl tetrahydro-4,5-epoxyphthalate; adipates, azelates, and sebacates, such as di(2-ethylhexyl) adipate, diisononyl adipate, diisodecyl adipate, benzyl 2-ethylhexyl adipate, di(2-ethylhexyl) azelate, diisooctyl azelate, di-n-hexyl azelate, dibutyl sebacate, and dioctyl sebacate; phosphates, such as triaryl phosphates, aryl alkyl phosphates, or trialkyl phosphates; polyester plasticizers, such as esters of sebacic acid, azelaic acid, adipic acid, or phthalic acid, with diols, such as 1,2-ethanediol, 1,2-propanediol, 1,3-propanediol, 1,3-butanediol, 1,4-butanediol, 1,5-pentanediol, 1,6-hexanediol, or 2,2-dimethyl-1,3-propanediol; nitrile-rubber-based elastomer plasticizers, ethylene-vinyl acetate copolymers, chloropolyethylene, methacrylate-styrene-acrylonitrile copolymers, acrylonitrile-styrene-butadiene copolymers, dialkyl sulfones, polycarbonates, polypropylene oxides, polyurethanes, and polylactones; and also other specialty PVC plasticizers known to the skilled worker, described by way of example in L. Meier "Weichmacher für PVC" in Becker/Braun Kunststoffhandbuch, Volume 2/1: Polyvinylchlorid, Carl Hanser Verlag Munich/Vienna 1986, pp 636-639.

Examples of diisononyl phthalates suitable according to the invention are Palatinol DN, Vestinol N, Witamol 150, Palatinol N, Vestinol 9, and Jayflex DINP.

According to the invention, particularly suitable plasticizers are subsituted or unsubstituted cyclohexanedicarboxylic acids or derivatives of these. A preferred embodiment of the invention therefore provides a one-part closure device where the plasticizer is a substituted or unsubstituted cyclohexanedicarboxylic acid or a derivative thereof.

The term "cyclohexanepolycarboxylic acids and derivatives thereof" according to the invention encompasses the respective cyclohexanepolycarboxylic acids per se, and also derivatives of these, and in this context mention may particularly be made of mono-, di-, and, where appropriate, tri- or tetraesters, and also anhydrides of cyclohexanepolycarboxylic acids. The esters used are alkyl, cycloalkyl, and also alkoxyalkyl esters, where the alkyl, cycloalkyl, and alkoxyalkyl groups generally encompass from 1 to 30, preferably from 2 to 20, and particularly preferably from 3 to 18, carbon atoms, and may be linear or branched.

For the purposes of the present invention, the cyclohexane-1,2-dicarboxylic acids or derivatives thereof may be present in the form of cis-isomer or in the form of trans-isomer, or in the form of a mixture of cis- and trans-isomer. The term cyclohexanedicarboxylic acids, in particular cyclohexane-1,2-dicarboxylic acids, is used hereinafter to refer equally to the cis-isomer, the trans-isomer, and a mixture of cis- and trans-isomer.

In one possible embodiment, the present invention therefore provides a one-part closure device where the cyclohexanedicarboxylic acid or the derivative thereof is selected from the group consisting of ring-hydrogenated mono- and dialkyl esters of phthalic acid, isophthalic acid, and terephthalic acid, ring-hydrogenated mono-, di-, and trialkyl esters of trimellitic acid, of trimesic acid, and of hemimellitic acid, and mono-, di-, tri-, and tetraalkyl esters of pyromellitic acid, where the alkyl groups may be linear or branched and each may have from 1 to 30 carbon atoms, ring-hydrogenated anhydrides of phthalic acid, trimellitic acid, trimesic acid, or hemimellitic acid, and pyromellitic dianhydride, and mixtures of two or more of these.

Particular mention may be made of the following specific and suitable cyclohexanedicarboxylic acids or derivatives thereof:

alkyl cyclohexane-1,4-dicarboxylates, e.g. monomethyl cyclohexane-1,4-dicarboxylate, dimethyl cyclohexane-1,4-dicarboxylate, diethyl cyclohexane-1,4-dicarboxylate, di-n-propyl cyclohexane-1,4-dicarboxylate, di-n-butyl cyclohexane-1,4-dicarboxylate, di-tert-butyl cyclohexane-1,4-dicarboxylate, diisobutyl cyclohexane-1,4-dicarboxylate, monoglycol cyclohexane-1,4-dicarboxylate, diglycol cyclohexane-1,4-dicarboxylate, di-n-octyl cyclohexane-1,4-dicarboxylate, diisooctyl cyclohexane-1,4-dicarboxylate, mono-2-ethylhexyl cyclohexane-1,4-dicarboxylate, di-2-ethylhexyl cyclohexane-1,4-dicarboxylate, di-n-nonyl cyclohexane-1,4-dicarboxylate, diisononyl cyclohexane-1,4-dicarboxylate, di-n-decyl cyclohexane-1,4-dicarboxylate, di-n-undecyl cyclohexane-1,4-dicarboxylate, diisodecyl cyclohexane-1,4-dicarboxylate, diisododecyl cyclohexane-1,4-dicarboxylate, di-n-octadecyl cyclohexane-1,4-dicarboxylate, diisooctadecyl cyclohexane-1,4-dicarboxylate, di-n-eicosyl cyclohexane-1,4-dicarboxylate, monocyclohexyl cyclohexane-1,4-dicarboxylate, dicyclohexyl cyclohexane-1,4-dicarboxylate;

diisopropyl cyclohexane-1,4-dicarboxylate, di-n-hexyl cyclohexane-1,4-dicarboxylate, diisohexyl cyclohexane-1,4-dicarboxylate, di-n-heptyl cyclohexane-1,4-dicarboxylate, diisoheptyl cyclohexane-1,4-dicarboxylate, di-2-propylheptyl cyclohexane-1,4-dicarboxylate, diisoundecyl cyclohexane-1,4-dicarboxylate, di-n-dodecyl cyclohexane-1,4-dicarboxylate, di-n-tridecyl cyclohexane-1,4-dicarboxylate, diisotridecyl cyclohexane-1,4-dicarboxylate, di-n-pentyl cyclohexane-1,4-dicarboxylate, diisopentyl cyclohexane-1,4-dicarboxylate;

diisopropyl cyclohexane-1,2-dicarboxylate, di-n-hexyl cyclohexane-1,2-dicarboxylate, diisohexyl cyclohexane-1,2-dicarboxylate, di-n-heptyl cyclohexane-1,2-dicarboxylate, diisoheptyl cyclohexane-1,2-dicarboxylate, di-2-propylheptyl cyclohexane-1,2-dicarboxylate, diisoundecyl cyclohexane-1,2-dicarboxylate, di-n-dodecyl cyclohexane-1,2-dicarboxylate, di-n-tridecyl cyclohexane-1,2-dicarboxylate, diisotridecyl cyclohexane-1,2-dicarboxylate, di-n-pentyl cyclohexane-1,2-dicarboxylate, diisopentyl cyclohexane-1,2-dicarboxylate;

alkyl cyclohexane-1,2-dicarboxylates, e.g. monomethyl cyclohexane-1,2-dicarboxylate, dimethyl cyclohexane-1,2-dicarboxylate, diethyl cyclohexane-1,2-dicarboxylate, di-n-propyl cyclohexane-1,2-dicarboxylate, di-n-butyl cyclohexane-1,2-dicarboxylate, di-tert-butyl cyclohexane-1,2-dicarboxylate, diisobutyl cyclohexane-1,2-dicarboxylate, monoglycol cyclohexane-1,2-dicarboxylate, diglycol cyclohexane-1,2-dicarboxylate, di-n-octyl cyclohexane-1,2-dicarboxylate, diisooctyl cyclohexane-1,2-dicarboxylate, di-2-ethylhexyl cyclohexane-1,2-dicarboxylate, di-n-nonyl cyclohexane-1,2-dicarboxylate, diisononyl cyclohexane-1,2-dicarboxylate, di-n-decyl cyclohexane-1,2-dicarboxylate, diisodecyl cyclohexane-1,2-dicarboxylate, di-n-undecyl cyclohexane-1,2-dicarboxylate, diisododecyl cyclohexane-1,2-dicarboxylate, di-n-octadecyl cyclohexane-1,2-dicarboxylate, diisooctadecyl cyclohexane-1,2-dicarboxylate, di-n-eicosyl cyclohexane-1,2-dicarboxylate, monocyclohexyl cyclohexane-1,2-dicarboxylate, dicyclohexyl cyclohexane-1,2-dicarboxylate;

mixed esters of cyclohexane-1,2-dicarboxylic acid with $C_1$-$C_{13}$ alcohols, e.g. ethyl methyl cyclohexane-1,2-dicarboxylate, n-propyl methyl cyclohexane-1,2-dicarboxylate, isopropyl methyl cyclohexane-1,2-dicarboxylate, n-butyl methyl cyclohexane-1,2-dicarboxylate, tert-butyl methyl cyclohexane-1,2-dicarboxylate, isobutyl methyl cyclohexane-1,2-dicarboxylate, glycol methyl cyclohexane-1,2-dicarboxylate, n-hexyl methyl cyclohexane-1,2-dicarboxylate, isohexyl methyl cyclohexane-1,2-dicarboxylate, n-heptyl methyl cyclohexane-1,2-dicarboxylate, isoheptyl methyl cyclohexane-1,2-dicarboxylate, n-octyl methyl cyclohexane-1,2-dicarboxylate, isooctyl methyl cyclohexane-1,2-dicarboxylate, 2-ethylhexyl methyl cyclohexane-1,2-dicarboxylate, n-nonyl methyl cyclohexane-1,2-dicarboxylate, isononyl methyl cyclohexane-1,2-dicarboxylate, 2-propylheptyl methyl cyclohexane-1,2-dicarboxylate, n-decyl methyl cyclohexane-1,2-dicarboxylate, isodecyl methyl cyclohexane-1,2-dicarboxylate, n-undecyl methyl cyclohexane-1,2-dicarboxylate, isoundecyl methyl cyclohexane-1,2- dicarboxylate, n-dodecyl methyl cyclohexane-1,2-dicarboxylate, isododecyl methyl cyclohexane-1,2-dicarboxylate, n-tridecyl methyl cyclohexane-1,2-dicarboxylate, isotridecyl methyl cyclohexane-1,2-dicarboxylate, n-propyl ethyl cyclohexane-1,2-dicarboxylate, isopropyl ethyl cyclohexane-1,2-dicarboxylate, n-butyl ethyl cyclohexane-1,2-dicarboxylate, tert-butyl ethyl cyclohexane-1,2-dicarboxylate, isobutyl ethyl cyclohexane-1,2-dicarboxylate, glycol ethyl cyclohexane-1,2-dicarboxylate, n-hexyl ethyl cyclohexane-1,2-dicarboxylate, isohexyl ethyl cyclohexane-1,2-dicarboxylate, n-heptyl ethyl cyclohexane-1,2-dicarboxylate, isoheptyl ethyl cyclohexane-1,2-dicarboxylate, n-octyl ethyl cyclohexane-1,2-dicarboxylate, isooctyl ethyl cyclohexane-1,2-dicarboxylate, 2-ethylhexyl ethyl cyclohexane-1,2-dicarboxylate, n-nonyl ethyl cyclohexane-1,2-dicarboxylate, isononyl ethyl cyclohexane-1,2-dicarboxylate, 2-propylheptyl ethyl cyclohexane-1,2-dicarboxylate, n-decyl ethyl cyclohexane-1,2-dicarboxylate, isodecyl ethyl cyclohexane-1,2-dicarboxylate, n-undecyl ethyl cyclohexane-1,2-dicarboxylate, isoundecyl ethyl cyclohexane-1,2-dicarboxylate, n-dodecyl ethyl cyclohexane-1,2-dicarboxylate, isododecyl ethyl cyclohexane-1,2-dicarboxylate, n-tridecyl ethyl cyclohexane-1,2-dicarboxylate, isotridecyl ethyl cyclohexane-1,2-dicarboxylate, isopropyl n-propyl cyclohexane-1,2-dicarboxylate, n-butyl n-propyl cyclohexane-1,2-dicarboxylate, tert-butyl n-propyl cyclohexane-1,2-dicarboxylate, isobutyl n-propyl cyclohexane-1,2-dicarboxylate, glycol n-propyl cyclohexane-1,2-dicarboxylate, n-hexyl n-propyl cyclohexane-1,2-dicarboxylate, isohexyl n-propyl cyclohexane-1,2-dicarboxylate, n-heptyl n-propyl cyclohexane-1,2-dicarboxylate, isoheptyl n-propyl cyclohexane-1,2-dicarboxylate, n-octyl n-propyl cyclohexane-1,2-dicarboxylate, isooctyl n-propyl cyclohexane-1,2-dicarboxylate, 2-ethylhexyl n-propyl cyclohexane-1,2-dicarboxylate, n-nonyl n-propyl cyclohexane-1,2-dicarboxylate, isononyl n-propyl cyclohexane-1,2-dicarboxylate, 2-propylheptyl n-propyl cyclohexane-1,2-dicarboxylate, n-decyl n-propyl cyclohexane-1,2-dicarboxylate, isodecyl n-propyl cyclohexane-1,2-dicarboxylate, n-undecyl n-propyl cyclohexane-1,2-dicarboxylate, isoundecyl n-propyl cyclohexane-1,2-dicarboxylate, n-dodecyl n-propyl cyclohexane-1,2-dicarboxylate, isododecyl n-propyl cyclohexane-1,2-dicarboxylate, n-tridecyl n-propyl cyclohexane-1,2-dicarboxylate, isotridecyl n-propyl cyclohexane-1,2-dicarboxylate, n-butyl isopropyl cyclohexane-1,2-dicarboxylate, tert-butyl isopropyl cyclohexane-1,2-dicarboxylate, isobutyl isopropyl cyclohexane-1,2-dicarboxylate, glycol isopropyl cyclohexane-1,2-dicarboxylate, n-hexyl isopropyl cyclohexane-1,2-dicarboxylate, isohexyl isopropyl cyclohexane-1,2-dicarboxylate, n-heptyl isopropyl cyclohexane-1,2-dicarboxylate, isoheptyl isopropyl cyclohexane-1,2-dicarboxylate, n-octyl isopropyl cyclohexane-1,2-dicarboxylate, isooctyl isopropyl cyclohexane-1,2-dicarboxylate, 2-ethylhexyl isopropyl cyclohexane-1,2-dicarboxylate, n-nonyl isopropyl cyclohexane-1,2-dicarboxylate, isononyl isopropyl cyclohexane-1,2-dicarboxylate, 2-propylheptyl isopropyl cyclohexane-1,2-dicarboxylate, n-decyl isopropyl cyclohexane-1,2-dicarboxylate, isodecyl isopropyl cyclohexane-1,2-dicarboxylate, n-undecyl isopropyl cyclohexane-1,2-dicarboxylate, isoundecyl isopropyl cyclohexane-1,2-dicarboxylate, n-dodecyl isopropyl cyclohexane-1,2-dicarboxylate, isododecyl isopropyl cyclohexane-1,2-dicarboxylate, n-tridecyl isopropyl cyclohexane-1,2-dicarboxylate, isotridecyl isopropyl cyclohexane-1,2-dicarboxylate, tert-butyl n-butyl cyclohexane-1,2-dicarboxylate, isobutyl n-butyl cyclohexane-1,2-dicarboxylate, glycol n-butyl cyclohexane-1,2-dicarboxylate, n-hexyl n-butyl cyclohexane-1,2-dicarboxylate, isohexyl n-butyl cyclohexane-1,2-dicarboxylate, n-heptyl n-butyl cyclohexane-1,2-dicarboxylate, isoheptyl n-butyl cyclohexane-1,2-dicarboxylate, n-octyl n-butyl cyclohexane-1,2-dicarboxylate, isooctyl n-butyl cyclohexane-1,2-dicarboxylate, 2-ethylhexyl n-butyl cyclohexane-1,2-dicarboxylate, n-nonyl n-butyl cyclohexane-1,2-dicarboxylate, isononyl n-butyl cyclohexane-1,2-dicarboxylate, 2-propylheptyl n-butyl cyclohexane-1,2-dicarboxylate, n-decyl n-butyl cyclohexane-1,2-dicarboxylate, isodecyl n-butyl cyclohexane-1,2-dicarboxylate, n-undecyl n-butyl cyclohexane-1,2-dicarboxylate, isoundecyl n-butyl cyclohexane-1,2-dicarboxylate, n-dodecyl n-butyl cyclohexane-1,2-dicarboxylate, isododecyl n-butyl cyclohexane-1,2-dicarboxylate, n-tridecyl n-butyl cyclohexane-1,2-dicarboxylate, isotridecyl n-butyl cyclohexane-1,2-dicarboxylate, isobutyl tert-butyl cyclohexane-1,2-dicarboxylate, glycol tert-butyl cyclohexane-1,2-dicarboxylate, n-hexyl tert-butyl cyclohexane-1,2-dicarboxylate, isohexyl tert-butyl cyclohexane-1,2-dicarboxylate, n-heptyl tert-butyl cyclohexane-1,2-dicarboxylate, isoheptyl tert-butyl cyclohexane-1,2-dicarboxylate, n-octyl tert-butyl cyclohexane-1,2-dicarboxylate, isooctyl tert-butyl cyclohexane-1,2-dicarboxylate, 2-ethylhexyl tert-butyl cyclohexane-1,2-dicarboxylate, n-nonyl tert-butyl cyclohexane-1,2-dicarboxylate, isononyl tert-butyl cyclohexane-1,2-dicarboxylate, 2-propylheptyl tert-butyl cyclohexane-1,2-dicarboxylate, n-decyl tert-butyl cyclohexane-1,2-dicarboxylate, isodecyl tert-butyl cyclohexane-1,2-dicarboxylate, n-undecyl tert-butyl cyclohexane-1,2-dicarboxylate, isoundecyl tert-butyl cyclohexane-1,2-dicarboxylate, n-dodecyl tert-butyl cyclohexane-1,2-dicarboxylate, isododecyl tert-butyl cyclohexane-1,2-dicarboxylate, n-tridecyl tert-butyl cyclohexane-1,2-dicarboxylate, isotridecyl tert-butyl cyclohexane-1,2-dicarboxylate, glycol isobutyl cyclohexane-1,2-dicarboxylate, n-hexyl isobutyl cyclohexane-1,2-dicarboxylate, isohexyl isobutyl cyclohexane-1,2-dicarboxylate, n-heptyl isobutyl cyclohexane-1,2-dicarboxylate, isoheptyl isobutyl cyclohexane-1,2-dicarboxylate, n-octyl isobutyl cyclohexane-1,2-dicarboxylate, isooctyl isobutyl cyclohexane-1,2-dicarboxylate, 2-ethylhexyl isobutyl cyclohexane-1,2-dicarboxylate, n-nonyl isobutyl cyclohexane-1,2-dicarboxylate, isononyl isobutyl cyclohexane-1,2-dicarboxylate, 2-propylheptyl isobutyl cyclohexane-1,2-dicarboxylate, n-decyl isobutyl cyclohexane-1,2-dicarboxylate, isodecyl isobutyl cyclohexane-1,2-dicarboxylate, n-undecyl isobutyl cyclohexane-1,2-dicarboxylate, isoundecyl isobutyl cyclohexane-1,2-dicarboxylate, n-dodecyl isobutyl cyclohexane-1,2-dicarboxylate, isododecyl isobutyl cyclohexane-1,2-dicarboxylate, n-tridecyl isobutyl cyclohexane-1,2-dicarboxylate, isotridecyl isobutyl cyclohexane-1,2-dicarboxylate, n-hexyl glycol cyclohexane-1,2- dicarboxylate, isohexyl glycol cyclohexane-1,2-dicarboxylate, n-heptyl glycol cyclohexane-1,2-dicarboxylate, isoheptyl glycol cyclohexane-1,2-dicarboxylate, n-octyl glycol cyclohexane-1,2-dicarboxylate, isooctyl glycol cyclohexane-1,2-dicarboxylate, 2-ethylhexyl glycol cyclohexane-1,2-dicarboxylate, n-nonyl glycol cyclohexane-1,2-dicarboxylate, isononyl glycol cyclohexane-1,2-dicarboxylate, 2-propylheptyl glycol cyclohexane-1,2-dicarboxylate, n-decyl glycol cyclohexane-1,2-dicarboxylate, isodecyl glycol cyclohexane-1,2-dicarboxylate, n-undecyl glycol cyclohexane-1,2-dicarboxylate, isoundecyl glycol cyclohexane-1,2-dicarboxylate, n-dodecyl glycol cyclohexane-1,2-dicarboxylate, isododecyl glycol cyclohexane-1,2-dicarboxylate, n-tridecyl glycol cyclohexane-1,2-dicarboxylate, isotridecyl glycol cyclohexane-1,2-dicarboxylate, isohexyl n-hexyl cyclohexane-1,2-dicarboxylate, n-heptyl n-hexyl cyclohexane-1,2-dicarboxylate, isoheptyl n-hexyl cyclohexane-1,2-dicarboxylate, n-octyl n-hexyl cyclohexane-1,2-dicarboxylate, isooctyl n-hexyl cyclohexane-1,2-dicarboxylate, 2-ethylhexyl n-hexyl cyclohexane-1,2-dicarboxylate, n-nonyl n-hexyl cyclohexane-1,2-dicarboxylate, isononyl n-hexyl cyclohexane-1,2-dicarboxylate, 2-propylheptyl n-hexyl cyclohexane-1,2-dicarboxylate, n-decyl n-hexyl cyclohexane-1,2-dicarboxylate, isodecyl n-hexyl cyclohexane-1,2-dicarboxylate, n-undecyl n-hexyl cyclohexane-1,2-dicarboxylate, isoundecyl n-hexyl cyclohexane-1,2-dicarboxylate, n-dodecyl n-hexyl cyclohexane-1,2-dicarboxylate, isododecyl n-hexyl cyclohexane-1,2-dicarboxylate, n-tridecyl n-hexyl cyclohexane-1,2-dicarboxylate, isotridecyl n-hexyl cyclohexane-1,2-dicarboxylate, n-heptyl isohexyl cyclohexane-1,2-dicarboxylate, isoheptyl isohexyl cyclohexane-1,2-dicarboxylate, n-octyl isohexyl cyclohexane-1,2-dicarboxylate, isooctyl isohexyl cyclohexane-1,2-dicarboxylate, 2-ethylhexyl isohexyl cyclohexane-1,2-dicarboxylate, n-nonyl isohexyl cyclohexane-1,2-dicarboxylate, isononyl isohexyl cyclohexane-1,2-dicarboxylate, 2-propylheptyl isohexyl cyclohexane-1,2-dicarboxylate, n-decyl isohexyl cyclohexane-1,2-dicarboxylate, isodecyl isohexyl cyclohexane-1,2-dicarboxylate, n-undecyl isohexyl cyclohexane-1,2-dicarboxylate, isoundecyl isohexyl cyclohexane-1,2-dicarboxylate, n-dodecyl isohexyl cyclohexane-1,2-dicarboxylate, isododecyl isohexyl cyclohexane-1,2-dicarboxylate, n-tridecyl isohexyl cyclohexane-1,2-dicarboxylate, isotridecyl isohexyl cyclohexane-1,2-dicarboxylate, isoheptyl n-heptyl cyclohexane-1,2-dicarboxylate, n-octyl n-heptyl cyclohexane-1,2-dicarboxylate, isooctyl n-heptyl cyclohexane-1,2-dicarboxylate, 2-ethylhexyl n-heptyl cyclohexane-1,2-dicarboxylate, n-nonyl n-heptyl cyclohexane-1,2-dicarboxylate, isononyl n-heptyl cyclohexane-1,2-dicarboxylate, 2-propylheptyl n-heptyl cyclohexane-1,2-dicarboxylate, n-decyl n-heptyl cyclohexane-1,2-dicarboxylate, isodecyl n-heptyl cyclohexane-1,2-dicarboxylate, n-undecyl n-heptyl cyclohexane-1,2-dicarboxylate, isoundecyl n-heptyl cyclohexane-1,2-dicarboxylate, n-dodecyl n-heptyl cyclohexane-1,2-dicarboxylate, isododecyl n-heptyl cyclohexane-1,2-dicarboxylate, n-tridecyl n-heptyl cyclohexane-1,2-dicarboxylate, isotridecyl n-heptyl cyclohexane-1,2-dicarboxylate, n-octyl isoheptyl cyclohexane-1,2-dicarboxylate, isooctyl isoheptyl cyclohexane-1,2-dicarboxylate, 2-ethylhexyl isoheptyl cyclohexane-1,2-dicarboxylate, n-nonyl isoheptyl cyclohexane-1,2-dicarboxylate, isononyl isoheptyl cyclohexane-1,2-dicarboxylate, 2-propylheptyl isoheptyl cyclohexane-1,2-dicarboxylate, n-decyl isoheptyl cyclohexane-1,2-dicarboxylate, isodecyl isoheptyl cyclohexane-1,2-dicarboxylate, n-undecyl isoheptyl cyclohexane-1,2-dicarboxylate, isoundecyl isoheptyl cyclohexane-1,2-dicarboxylate, n-dodecyl isoheptyl cyclohexane-1,2-dicarboxylate, isododecyl isoheptyl cyclohexane-1,2-dicarboxylate, n-tridecyl isoheptyl cyclohexane-1,2-dicarboxylate, isotridecyl isoheptyl cyclohexane-1,2-dicarboxylate, isooctyl n-octyl cyclohexane-1,2-dicarboxylate, 2-ethylhexyl n-octyl cyclohexane-1,2-dicarboxylate, n-nonyl n-octyl cyclohexane-1,2-dicarboxylate, isononyl n-octyl cyclohexane-1,2-dicarboxylate, 2-propylheptyl n-octyl cyclohexane-1,2-dicarboxylate, n-decyl n-octyl cyclohexane-1,2-dicarboxylate, isodecyl n-octyl cyclohexane-1,2-dicarboxylate, n-undecyl n-octyl cyclohexane-1,2-dicarboxylate, isoundecyl n-octyl cyclohexane-1,2-dicarboxylate, n-dodecyl n-octyl cyclohexane-1,2-dicarboxylate, isododecyl n-octyl cyclohexane-1,2-dicarboxylate, n-tridecyl n-octyl cyclohexane-1,2-dicarboxylate, isotridecyl n-octyl cyclohexane-1,2-dicarboxylate, 2-ethylhexyl isooctyl cyclohexane-1,2-dicarboxylate, n-nonyl isooctyl cyclohexane-1,2-dicarboxylate, isononyl isooctyl cyclohexane-1,2-dicarboxylate, 2-propylheptyl isooctyl cyclohexane-1,2-dicarboxylate, n-decyl isooctyl cyclohexane-1,2-dicarboxylate, isodecyl isooctyl cyclohexane-1,2-dicarboxylate, n-undecyl isooctyl cyclohexane-1,2-dicarboxylate, isoundecyl isooctyl cyclohexane-1,2-dicarboxylate, n-dodecyl isooctyl cyclohexane-1,2-dicarboxylate, isododecyl isooctyl cyclohexane-1,2-dicarboxylate, n-tridecyl isooctyl cyclohexane-1,2-dicarboxylate, isotridecyl isooctyl cyclohexane-1,2-dicarboxylate, n-nonyl 2-ethylhexyl cyclohexane-1,2-dicarboxylate, isononyl 2-ethylhexyl cyclohexane-1,2-dicarboxylate, 2-propylheptyl 2-ethylhexyl cyclohexane-1,2-dicarboxylate, n-decyl 2-ethylhexyl cyclohexane-1,2-dicarboxylate, isodecyl 2-ethylhexyl cyclohexane-1,2-dicarboxylate, n-undecyl 2-ethylhexyl cyclohexane-1,2-dicarboxylate, isoundecyl 2-ethylhexyl cyclohexane-1,2-dicarboxylate, n-dodecyl 2-ethylhexyl cyclohexane-1,2-dicarboxylate, isododecyl 2-ethylhexyl cyclohexane-1,2-dicarboxylate, n-tridecyl 2-ethylhexyl cyclohexane-1,2-dicarboxylate, isotridecyl 2-ethylhexyl cyclohexane-1,2-dicarboxylate, isononyl n-nonyl cyclohexane-1,2-dicarboxylate, 2-propylheptyl n-nonyl cyclohexane-1,2-dicarboxylate, n-decyl n-nonyl cyclohexane-1,2-dicarboxylate, isodecyl n-nonyl cyclohexane-1,2-dicarboxylate, n-undecyl n-nonyl cyclohexane-1,2-dicarboxylate, isoundecyl n-nonyl cyclohexane-1,2-dicarboxylate, n-dodecyl n-nonyl cyclohexane-1,2-dicarboxylate, isododecyl n-nonyl cyclohexane-1,2-dicarboxylate, n-tridecyl n-nonyl cyclohexane-1,2-dicarboxylate, isotridecyl n-nonyl cyclohexane-1,2-dicarboxylate, 2-propylheptyl isononyl cyclohexane-1,2-dicarboxylate, n-decyl isononyl cyclohexane-1,2-dicarboxylate, isodecyl isononyl cyclohexane-1,2-dicarboxylate, n-undecyl isononyl cyclohexane-1,2-dicarboxylate, isoundecyl isononyl cyclohexane-1,2-dicarboxylate, n-dodecyl isononyl cyclohexane-1,2-dicarboxylate, isododecyl isononyl cyclohexane-1,2-dicarboxylate, n-tridecyl isononyl cyclohexane-1,2-dicarboxylate, isotridecyl isononyl cyclohexane-1,2- dicarboxylate, n-decyl 2-propylheptyl cyclohexane-1,2-dicarboxylate, isodecyl 2-propylheptyl cyclohexane-1,2-dicarboxylate, n-undecyl 2-propylheptyl cyclohexane-1,2-dicarboxylate, isoundecyl 2-propylheptyl cyclohexane-1,2-dicarboxylate, n-dodecyl 2-propylheptyl cyclohexane-1,2-dicarboxylate, isododecyl 2-propylheptyl cyclohexane-1,2-dicarboxylate, n-tridecyl 2-propylheptyl cyclohexane-1,2-dicarboxylate, isotridecyl 2-propylheptyl cyclohexane-1,2-dicarboxylate, isodecyl n-decyl cyclohexane-1,2-dicarboxylate, n-undecyl n-decyl cyclohexane-1,2-dicarboxylate, isoundecyl n-decyl cyclohexane-1,2-dicarboxylate, n-dodecyl n-decyl cyclohexane-1,2-dicarboxylate, isododecyl n-decyl cyclohexane-1,2-dicarboxylate, n-tridecyl n-decyl cyclohexane-1,2-dicarboxylate, isotridecyl n-decyl cyclohexane-1,2-dicarboxylate, n-undecyl isodecyl cyclohexane-1,2-dicarboxylate, isoundecyl isodecyl cyclohexane-1,2-dicarboxylate, n-dodecyl isodecyl cyclohexane-1,2-dicarboxylate, isododecyl isodecyl cyclohexane-1,2-dicarboxylate, n-tridecyl isodecyl cyclohexane-1,2-dicarboxylate, isotridecyl isodecyl cyclohexane-1,2-dicarboxylate, isoundecyl n-undecyl cyclohexane-1,2-dicarboxylate, n-dodecyl n-undecyl cyclohexane-1,2-dicarboxylate, isododecyl n-undecyl cyclohexane-1,2-dicarboxylate, n-tridecyl n-undecyl cyclohexane-1,2-dicarboxylate, isotridecyl n-undecyl cyclohexane-1,2-dicarboxylate, n-dodecyl isoundecyl cyclohexane-1,2-dicarboxylate, isododecyl isoundecyl cyclohexane-1,2-dicarboxylate, n-tridecyl isoundecyl cyclohexane-1,2-dicarboxylate, isotridecyl isoundecyl cyclohexane-1,2-dicarboxylate, isododecyl n-dodecyl cyclohexane-1,2-dicarboxylate, n-tridecyl n-dodecyl cyclohexane-1,2-dicarboxylate, isotridecyl n-dodecyl cyclohexane-1,2-dicarboxylate, n-tridecyl isododecyl cyclohexane-1,2-dicarboxylate, isotridecyl isododecyl cyclohexane-1,2-dicarboxylate, isotridecyl n-tridecyl cyclohexane-1,2-dicarboxylate, methyl cyclohexyl cyclohexane-1,2-dicarboxylate, ethyl cyclohexyl cyclohexane-1,2-dicarboxylate, n-propyl cyclohexyl cyclohexane-1,2-dicarboxylate, isopropyl cyclohexyl cyclohexane-1,2-dicarboxylate, n-butyl cyclohexyl cyclohexane-1,2-dicarboxylate, tert-butyl cyclohexyl cyclohexane-1,2-dicarboxylate, isobutyl cyclohexyl cyclohexane-1,2-dicarboxylate, glycol cyclohexyl cyclohexane-1,2-dicarboxylate, n-hexyl cyclohexyl cyclohexane-1,2-dicarboxylate, isohexyl cyclohexyl cyclohexane-1,2-dicarboxylate, n-heptyl cyclohexyl cyclohexane-1,2-dicarboxylate, isoheptyl cyclohexyl cyclohexane-1,2-dicarboxylate, n-octyl cyclohexyl cyclohexane-1,2-dicarboxylate, isooctyl cyclohexyl cyclohexane-1,2-dicarboxylate, 2-ethylhexyl cyclohexyl cyclohexane-1,2-dicarboxylate, n-nonyl cyclohexyl cyclohexane-1,2-dicarboxylate, isononyl cyclohexyl cyclohexane-1,2-dicarboxylate, 2-propylheptyl cyclohexyl cyclohexane-1,2-dicarboxylate, n-decyl cyclohexyl cyclohexane-1,2-dicarboxylate, isodecyl cyclohexyl cyclohexane-1,2-dicarboxylate, n-undecyl cyclohexyl cyclohexane-1,2-dicarboxylate, isoundecyl cyclohexyl cyclohexane-1,2-dicarboxylate, n-dodecyl cyclohexyl cyclohexane-1,2-dicarboxylate, isododecyl cyclohexyl cyclohexane-1,2-dicarboxylate, n-tridecyl cyclohexyl cyclohexane-1,2-dicarboxylate, isotridecyl cyclohexyl cyclohexane-1,2-dicarboxylate, methyl isopentyl cyclohexane-1,2-dicarboxylate, ethyl isopentyl cyclohexane-1,2-dicarboxylate, n-propyl isopentyl cyclohexane-1,2-dicarboxylate, isopropyl isopentyl cyclohexane-1,2-dicarboxylate, n-butyl isopentyl cyclohexane-1,2-dicarboxylate, tert-butyl isopentyl cyclohexane-1,2-dicarboxylate, isobutyl isopentyl cyclohexane-1,2-dicarboxylate, glycol isopentyl cyclohexane-1,2-dicarboxylate, n-hexyl isopentyl cyclohexane-1,2-dicarboxylate, isohexyl isopentyl cyclohexane-1,2-dicarboxylate, n-heptyl isopentyl cyclohexane-1,2-dicarboxylate, isoheptyl isopentyl cyclohexane-1,2-dicarboxylate, n-octyl isopentyl cyclohexane-1,2-dicarboxylate, isooctyl isopentyl cyclohexane-1,2-dicarboxylate, 2-ethylhexyl isopentyl cyclohexane-1,2-dicarboxylate, n-nonyl isopentyl cyclohexane-1,2-dicarboxylate, isononyl isopentyl cyclohexane-1,2-dicarboxylate, 2-propylheptyl isopentyl cyclohexane-1,2-dicarboxylate, n-decyl isopentyl cyclohexane-1,2-dicarboxylate, isodecyl isopentyl cyclohexane-1,2-dicarboxylate, n-undecyl isopentyl cyclohexane-1,2-dicarboxylate, isoundecyl isopentyl cyclohexane-1,2-dicarboxylate, n-dodecyl isopentyl cyclohexane-1,2-dicarboxylate, isododecyl isopentyl cyclohexane-1,2-dicarboxylate, n-tridecyl isopentyl cyclohexane-1,2-dicarboxylate, isotridecyl isopentyl cyclohexane-1,2-dicarboxylate, methyl n-pentyl cyclohexane-1,2-dicarboxylate, ethyl n-pentyl cyclohexane-1,2-dicarboxylate, n-propyl n-pentyl cyclohexane-1,2-dicarboxylate, isopropyl n-pentyl cyclohexane-1,2-dicarboxylate, n-butyl n-pentyl cyclohexane-1,2-dicarboxylate, tert-butyl n-pentyl cyclohexane-1,2-dicarboxylate, isobutyl n-pentyl cyclohexane-1,2-dicarboxylate, glycol n-pentyl cyclohexane-1,2-dicarboxylate, n-hexyl n-pentyl cyclohexane-1,2-dicarboxylate, isohexyl n-pentyl cyclohexane-1,2-dicarboxylate, n-heptyl n-pentyl cyclohexane-1,2-dicarboxylate, isoheptyl n-pentyl cyclohexane-1,2-dicarboxylate, n-octyl n-pentyl cyclohexane-1,2-dicarboxylate, isooctyl n-pentyl cyclohexane-1,2-dicarboxylate, 2-ethylhexyl n-pentyl cyclohexane-1,2-dicarboxylate, n-nonyl n-pentyl cyclohexane-1,2-dicarboxylate, isononyl n-pentyl cyclohexane-1,2-dicarboxylate, 2-propylheptyl n-pentyl cyclohexane-1,2-dicarboxylate, n-decyl n-pentyl cyclohexane-1,2-dicarboxylate, isodecyl n-pentyl cyclohexane-1,2-dicarboxylate, n-undecyl n-pentyl cyclohexane-1,2-dicarboxylate, isoundecyl n-pentyl cyclohexane-1,2-dicarboxylate, n-dodecyl n-pentyl cyclohexane-1,2-dicarboxylate, isododecyl n-pentyl cyclohexane-1,2-dicarboxylate, n-tridecyl n-pentyl cyclohexane-1,2-dicarboxylate, isotridecyl n-pentyl cyclohexane-1,2-dicarboxylate;

mixed esters of cyclohexane-1,3-dicarboxylic acid with $C_1$-$C_{13}$ alcohols, e.g. ethyl methyl cyclohexane-1,3-dicarboxylate, n-propyl methyl cyclohexane-1,3-dicarboxylate, isopropyl methyl cyclohexane-1,3-dicarboxylate, n-butyl methyl cyclohexane-1,3-dicarboxylate, tert-butyl methyl cyclohexane-1,3-dicarboxylate, isobutyl methyl cyclohexane-1,3-dicarboxylate, glycol methyl cyclohexane-1,3-dicarboxylate, n-hexyl methyl cyclohexane-1,3-dicarboxylate, isohexyl methyl cyclohexane-1,3-dicarboxylate, n-heptyl methyl cyclohexane-1,3-dicarboxylate, isoheptyl methyl cyclohexane-1,3-dicarboxylate, n-octyl methyl cyclohexane-1,3-dicarboxylate, isooctyl methyl cyclohexane-1,3-dicarboxylate, 2-ethylhexyl methyl cyclohexane-1,3-dicarboxylate, n-nonyl methyl cyclohexane-1,3-dicarboxylate, isononyl methyl cyclohexane-1,3-dicarboxylate, 2-propylheptyl methyl cyclohexane-1,3-dicarboxylate, n-decyl methyl cyclohexane-1,3-dicarboxylate, isodecyl methyl cyclohexane-1,3-dicarboxylate, n-undecyl methyl cyclohexane-1,3- dicarboxylate, isoundecyl methyl cyclohexane-1,3-dicarboxylate, n-dodecyl methyl cyclohexane-1,3-dicarboxylate, isododecyl methyl cyclohexane-1,3-dicarboxylate, n-tridecyl methyl cyclohexane-1,3-dicarboxylate, isotridecyl methyl cyclohexane-1,3-dicarboxylate, n-propyl ethyl cyclohexane-1,3-dicarboxylate, isopropyl ethyl cyclohexane-1,3-dicarboxylate, n-butyl ethyl cyclohexane-1,3-dicarboxylate, tert-butyl ethyl cyclohexane-1,3-dicarboxylate, isobutyl ethyl cyclohexane-1,3-dicarboxylate, glycol ethyl cyclohexane-1,3-dicarboxylate, n-hexyl ethyl cyclohexane-1,3-dicarboxylate, isohexyl ethyl cyclohexane-1,3-dicarboxylate, n-heptyl ethyl cyclohexane-1,3-dicarboxylate, isoheptyl ethyl cyclohexane-1,3-dicarboxylate, n-octyl ethyl cyclohexane-1,3-dicarboxylate, isooctyl ethyl cyclohexane-1,3-dicarboxylate, 2-ethylhexyl ethyl cyclohexane-1,3-dicarboxylate, n-nonyl ethyl cyclohexane-1,3-dicarboxylate, isononyl ethyl cyclohexane-1,3-dicarboxylate, 2-propylheptyl ethyl cyclohexane-1,3-dicarboxylate, n-decyl ethyl cyclohexane-1,3-dicarboxylate, isodecyl ethyl cyclohexane-1,3-dicarboxylate, n-undecyl ethyl cyclohexane-1,3-dicarboxylate, isoundecyl ethyl cyclohexane-1,3-dicarboxylate, n-dodecyl ethyl cyclohexane-1,3-dicarboxylate, isododecyl ethyl cyclohexane-1,3-dicarboxylate, n-tridecyl ethyl cyclohexane-1,3-dicarboxylate, isotridecyl ethyl cyclohexane-1,3-dicarboxylate, isopropyl n-propyl cyclohexane-1,3-dicarboxylate, n-butyl n-propyl cyclohexane-1,3-dicarboxylate, tert-butyl n-propyl cyclohexane-1,3-dicarboxylate, isobutyl n-propyl cyclohexane-1,3-dicarboxylate, glycol n-propyl cyclohexane-1,3-dicarboxylate, n-hexyl n-propyl cyclohexane-1,3-dicarboxylate, isohexyl n-propyl cyclohexane-1,3-dicarboxylate, n-heptyl n-propyl cyclohexane-1,3-dicarboxylate, isoheptyl n-propyl cyclohexane-1,3-dicarboxylate, n-octyl n-propyl cyclohexane-1,3-dicarboxylate, isooctyl n-propyl cyclohexane-1,3-dicarboxylate, 2-ethylhexyl n-propyl cyclohexane-1,3-dicarboxylate, n-nonyl n-propyl cyclohexane-1,3-dicarboxylate, isononyl n-propyl cyclohexane-1,3-dicarboxylate, 2-propylheptyl n-propyl cyclohexane-1,3-dicarboxylate, n-decyl n-propyl cyclohexane-1,3-dicarboxylate, isodecyl n-propyl cyclohexane-1,3-dicarboxylate, n-undecyl n-propyl cyclohexane-1,3-dicarboxylate, isoundecyl n-propyl cyclohexane-1,3-dicarboxylate, n-dodecyl n-propyl cyclohexane-1,3-dicarboxylate, isododecyl n-propyl cyclohexane-1,3-dicarboxylate, n-tridecyl n-propyl cyclohexane-1,3-dicarboxylate, isotridecyl n-propyl cyclohexane-1,3-dicarboxylate, n-butyl isopropyl cyclohexane-1,3-dicarboxylate, tert-butyl isopropyl cyclohexane-1,3-dicarboxylate, isobutyl isopropyl cyclohexane-1,3-dicarboxylate, glycol isopropyl cyclohexane-1,3-dicarboxylate, n-hexyl isopropyl cyclohexane-1,3-dicarboxylate, isohexyl isopropyl cyclohexane-1,3-dicarboxylate, n-heptyl isopropyl cyclohexane-1,3-dicarboxylate, isoheptyl isopropyl cyclohexane-1,3-dicarboxylate, n-octyl isopropyl cyclohexane-1,3-dicarboxylate, isooctyl isopropyl cyclohexane-1,3-dicarboxylate, 2-ethylhexyl isopropyl cyclohexane-1,3-dicarboxylate, n-nonyl isopropyl cyclohexane-1,3-dicarboxylate, isononyl isopropyl cyclohexane-1,3-dicarboxylate, 2-propylheptyl isopropyl cyclohexane-1,3-dicarboxylate, n-decyl isopropyl cyclohexane-1,3-dicarboxylate, isodecyl isopropyl cyclohexane-1,3-dicarboxylate, n-undecyl isopropyl cyclohexane-1,3-dicarboxylate, isoundecyl isopropyl cyclohexane-1,3-dicarboxylate, n-dodecyl isopropyl cyclohexane-1,3-dicarboxylate, isododecyl isopropyl cyclohexane-1,3-dicarboxylate, n-tridecyl isopropyl cyclohexane-1,3-dicarboxylate, isotridecyl isopropyl cyclohexane-1,3-dicarboxylate, tert-butyl n-butyl cyclohexane-1,3-dicarboxylate, isobutyl n-butyl cyclohexane-1,3-dicarboxylate, glycol n-butyl cyclohexane-1,3-dicarboxylate, n-hexyl n-butyl cyclohexane-1,3-dicarboxylate, isohexyl n-butyl cyclohexane-1,3-dicarboxylate, n-heptyl n-butyl cyclohexane-1,3-dicarboxylate, isoheptyl n-butyl cyclohexane-1,3-dicarboxylate, n-octyl n-butyl cyclohexane-1,3-dicarboxylate, isooctyl n-butyl cyclohexane-1,3-dicarboxylate, 2-ethylhexyl n-butyl cyclohexane-1,3-dicarboxylate, n-nonyl n-butyl cyclohexane-1,3-dicarboxylate, isononyl n-butyl cyclohexane-1,3-dicarboxylate, 2-propylheptyl n-butyl cyclohexane-1,3-dicarboxylate, n-decyl n-butyl cyclohexane-1,3-dicarboxylate, isodecyl n-butyl cyclohexane-1,3-dicarboxylate, n-undecyl n-butyl cyclohexane-1,3-dicarboxylate, isoundecyl n-butyl cyclohexane-1,3-dicarboxylate, n-dodecyl n-butyl cyclohexane-1,3-dicarboxylate, isododecyl n-butyl cyclohexane-1,3-dicarboxylate, n-tridecyl n-butyl cyclohexane-1,3-dicarboxylate, isotridecyl n-butyl cyclohexane-1,3-dicarboxylate, isobutyl tert-butyl cyclohexane-1,3-dicarboxylate, glycol tert-butyl cyclohexane-1,3-dicarboxylate, n-hexyl tert-butyl cyclohexane-1,3-dicarboxylate, isohexyl tert-butyl cyclohexane-1,3-dicarboxylate, n-heptyl tert-butyl cyclohexane-1,3-dicarboxylate, isoheptyl tert-butyl cyclohexane-1,3-dicarboxylate, n-octyl tert-butyl cyclohexane-1,3-dicarboxylate, isooctyl tert-butyl cyclohexane-1,3-dicarboxylate, 2-ethylhexyl tert-butyl cyclohexane-1,3-dicarboxylate, n-nonyl tert-butyl cyclohexane-1,3-dicarboxylate, isononyl tert-butyl cyclohexane-1,3-dicarboxylate, 2-propylheptyl tert-butyl cyclohexane-1,3-dicarboxylate, n-decyl tert-butyl cyclohexane-1,3-dicarboxylate, isodecyl tert-butyl cyclohexane-1,3-dicarboxylate, n-undecyl tert-butyl cyclohexane-1,3-dicarboxylate, isoundecyl tert-butyl cyclohexane-1,3-dicarboxylate, n-dodecyl tert-butyl cyclohexane-1,3-dicarboxylate, isododecyl tert-butyl cyclohexane-1,3-dicarboxylate, n-tridecyl tert-butyl cyclohexane-1,3-dicarboxylate, isotridecyl tert-butyl cyclohexane-1,3-dicarboxylate, glycol isobutyl cyclohexane-1,3-dicarboxylate, n-hexyl isobutyl cyclohexane-1,3-dicarboxylate, isohexyl isobutyl cyclohexane-1,3-dicarboxylate, n-heptyl isobutyl cyclohexane-1,3-dicarboxylate, isoheptyl isobutyl cyclohexane-1,3-dicarboxylate, n-octyl isobutyl cyclohexane-1,3-dicarboxylate, isooctyl isobutyl cyclohexane-1,3-dicarboxylate, 2-ethylhexyl isobutyl cyclohexane-1,3-dicarboxylate, n-nonyl isobutyl cyclohexane-1,3-dicarboxylate, isononyl isobutyl cyclohexane-1,3-dicarboxylate, 2-propylheptyl isobutyl cyclohexane-1,3-dicarboxylate, n-decyl isobutyl cyclohexane-1,3-dicarboxylate, isodecyl isobutyl cyclohexane-1,3-dicarboxylate, n-undecyl isobutyl cyclohexane-1,3-dicarboxylate, isoundecyl isobutyl cyclohexane-1,3-dicarboxylate, n-dodecyl isobutyl cyclohexane-1,3-dicarboxylate, isododecyl isobutyl cyclohexane-1,3-dicarboxylate, n-tridecyl isobutyl cyclohexane-1,3-dicarboxylate, isotridecyl isobutyl cyclohexane-1,3- dicarboxylate, n-hexyl glycol cyclohexane-1,3-dicarboxylate, isohexyl glycol cyclohexane-1,3-dicarboxylate, n-heptyl glycol cyclohexane-1,3-dicarboxylate, isoheptyl glycol cyclohexane-1,3-dicarboxylate, n-octyl glycol cyclohexane-1,3-dicarboxylate, isooctyl glycol cyclohexane-1,3-dicarboxylate, 2-ethylhexyl glycol cyclohexane-1,3-dicarboxylate, n-nonyl glycol cyclohexane-1,3-dicarboxylate, isononyl glycol cyclohexane-1,3-dicarboxylate, 2-propylheptyl glycol cyclohexane-1,3-dicarboxylate, n-decyl glycol cyclohexane-1,3-dicarboxylate, isodecyl glycol cyclohexane-1,3-dicarboxylate, n-undecyl glycol cyclohexane-1,3-dicarboxylate, isoundecyl glycol cyclohexane-1,3-dicarboxylate, n-dodecyl glycol cyclohexane-1,3-dicarboxylate, isododecyl glycol cyclohexane-1,3-dicarboxylate, n-tridecyl glycol cyclohexane-1,3-dicarboxylate, isotridecyl glycol cyclohexane-1,3-dicarboxylate, isohexyl n-hexyl cyclohexane-1,3-dicarboxylate, n-heptyl n-hexyl cyclohexane-1,3-dicarboxylate, isoheptyl n-hexyl cyclohexane-1,3-dicarboxylate, n-octyl n-hexyl cyclohexane-1,3-dicarboxylate, isooctyl n-hexyl cyclohexane-1,3-dicarboxylate, 2-ethylhexyl n-hexyl cyclohexane-1,3-dicarboxylate, n-nonyl n-hexyl cyclohexane-1,3-dicarboxylate, isononyl n-hexyl cyclohexane-1,3-dicarboxylate, 2-propylheptyl n-hexyl cyclohexane-1,3-dicarboxylate, n-decyl n-hexyl cyclohexane-1,3-dicarboxylate, isodecyl n-hexyl cyclohexane-1,3-dicarboxylate, n-undecyl n-hexyl cyclohexane-1,3-dicarboxylate, isoundecyl n-hexyl cyclohexane-1,3-dicarboxylate, n-dodecyl n-hexyl cyclohexane-1,3-dicarboxylate, isododecyl n-hexyl cyclohexane-1,3-dicarboxylate, n-tridecyl n-hexyl cyclohexane-1,3-dicarboxylate, isotridecyl n-hexyl cyclohexane-1,3-dicarboxylate, n-heptyl isohexyl cyclohexane-1,3-dicarboxylate, isoheptyl isohexyl cyclohexane-1,3-dicarboxylate, n-octyl isohexyl cyclohexane-1,3-dicarboxylate, isooctyl isohexyl cyclohexane-1,3-dicarboxylate, 2-ethylhexyl isohexyl cyclohexane-1,3-dicarboxylate, n-nonyl isohexyl cyclohexane-1,3-dicarboxylate, isononyl isohexyl cyclohexane-1,3-dicarboxylate, 2-propylheptyl isohexyl cyclohexane-1,3-dicarboxylate, n-decyl isohexyl cyclohexane-1,3-dicarboxylate, isodecyl isohexyl cyclohexane-1,3-dicarboxylate, n-undecyl isohexyl cyclohexane-1,3-dicarboxylate, isoundecyl isohexyl cyclohexane-1,3-dicarboxylate, n-dodecyl isohexyl cyclohexane-1,3-dicarboxylate, isododecyl isohexyl cyclohexane-1,3-dicarboxylate, n-tridecyl isohexyl cyclohexane-1,3-dicarboxylate, isotridecyl isohexyl cyclohexane-1,3-dicarboxylate, isoheptyl n-heptyl cyclohexane-1,3-dicarboxylate, n-octyl n-heptyl cyclohexane-1,3-dicarboxylate, isooctyl n-heptyl cyclohexane-1,3-dicarboxylate, 2-ethylhexyl n-heptyl cyclohexane-1,3-dicarboxylate, n-nonyl n-heptyl cyclohexane-1,3-dicarboxylate, isononyl n-heptyl cyclohexane-1,3-dicarboxylate, 2-propylheptyl n-heptyl cyclohexane-1,3-dicarboxylate, n-decyl n-heptyl cyclohexane-1,3-dicarboxylate, isodecyl n-heptyl cyclohexane-1,3-dicarboxylate, n-undecyl n-heptyl cyclohexane-1,3-dicarboxylate, isoundecyl n-heptyl cyclohexane-1,3-dicarboxylate, n-dodecyl n-heptyl cyclohexane-1,3-dicarboxylate, isododecyl n-heptyl cyclohexane-1,3-dicarboxylate, n-tridecyl n-heptyl cyclohexane-1,3-dicarboxylate, isotridecyl n-heptyl cyclohexane-1,3-dicarboxylate, n-octyl isoheptyl cyclohexane-1,3-dicarboxylate, isooctyl isoheptyl cyclohexane-1,3-dicarboxylate, 2-ethylhexyl isoheptyl cyclohexane-1,3-dicarboxylate, n-nonyl isoheptyl cyclohexane-1,3-dicarboxylate, isononyl isoheptyl cyclohexane-1,3-dicarboxylate, 2-propylheptyl isoheptyl cyclohexane-1,3-dicarboxylate, n-decyl isoheptyl cyclohexane-1,3-dicarboxylate, isodecyl isoheptyl cyclohexane-1,3-dicarboxylate, n-undecyl isoheptyl cyclohexane-1,3-dicarboxylate, isoundecyl isoheptyl cyclohexane-1,3-dicarboxylate, n-dodecyl isoheptyl cyclohexane-1,3-dicarboxylate, isododecyl isoheptyl cyclohexane-1,3-dicarboxylate, n-tridecyl isoheptyl cyclohexane-1,3-dicarboxylate, isotridecyl isoheptyl cyclohexane-1,3-dicarboxylate, isooctyl n-octyl cyclohexane-1,3-dicarboxylate, 2-ethylhexyl n-octyl cyclohexane-1,3-dicarboxylate, n-nonyl n-octyl cyclohexane-1,3-dicarboxylate, isononyl n-octyl cyclohexane-1,3-dicarboxylate, 2-propylheptyl n-octyl cyclohexane-1,3-dicarboxylate, n-decyl n-octyl cyclohexane-1,3-dicarboxylate, isodecyl n-octyl cyclohexane-1,3-dicarboxylate, n-undecyl n-octyl cyclohexane-1,3-dicarboxylate, isoundecyl n-octyl cyclohexane-1,3-dicarboxylate, n-dodecyl n-octyl cyclohexane-1,3-dicarboxylate, isododecyl n-octyl cyclohexane-1,3-dicarboxylate, n-tridecyl n-octyl cyclohexane-1,3-dicarboxylate, isotridecyl n-octyl cyclohexane-1,3-dicarboxylate, 2-ethylhexyl isooctyl cyclohexane-1,3-dicarboxylate, n-nonyl isooctyl cyclohexane-1,3-dicarboxylate, isononyl isooctyl cyclohexane-1,3-dicarboxylate, 2-propylheptyl isooctyl cyclohexane-1,3-dicarboxylate, n-decyl isooctyl cyclohexane-1,3-dicarboxylate, isodecyl isooctyl cyclohexane-1,3-dicarboxylate, n-undecyl isooctyl cyclohexane-1,3-dicarboxylate, isoundecyl isooctyl cyclohexane-1,3-dicarboxylate, n-dodecyl isooctyl cyclohexane-1,3-dicarboxylate, isododecyl isooctyl cyclohexane-1,3-dicarboxylate, n-tridecyl isooctyl cyclohexane-1,3-dicarboxylate, isotridecyl isooctyl cyclohexane-1,3-dicarboxylate, n-nonyl 2-ethylhexyl cyclohexane-1,3-dicarboxylate, isononyl 2-ethylhexyl cyclohexane-1,3-dicarboxylate, 2-propylheptyl 2-ethylhexyl cyclohexane-1,3-dicarboxylate, n-decyl 2-ethylhexyl-cyclohexane-1,3-dicarboxylate, isodecyl 2-ethylhexyl cyclohexane-1,3-dicarboxylate, n-undecyl 2-ethylhexyl cyclohexane-1,3-dicarboxylate, isoundecyl 2-ethylhexyl cyclohexane-1,3-dicarboxylate, n-dodecyl 2-ethylhexyl cyclohexane-1,3-dicarboxylate, isododecyl 2-ethylhexyl cyclohexane-1,3-dicarboxylate, n-tridecyl 2-ethylhexyl cyclohexane-1,3-dicarboxylate, isotridecyl 2-ethylhexyl cyclohexane-1,3-dicarboxylate, isononyl n-nonyl cyclohexane-1,3-dicarboxylate, 2-propylheptyl n-nonyl cyclohexane-1,3-dicarboxylate, n-decyl n-nonyl cyclohexane-1,3-dicarboxylate, isodecyl n-nonyl cyclohexane-1,3-dicarboxylate, n-undecyl n-nonyl cyclohexane-1,3-dicarboxylate, isoundecyl n-nonyl cyclohexane-1,3-dicarboxylate, n-dodecyl n-nonyl cyclohexane-1,3-dicarboxylate, isododecyl n-nonyl cyclohexane-1,3-dicarboxylate, n-tridecyl n-nonyl cyclohexane-1,3-dicarboxylate, isotridecyl n-nonyl cyclohexane-1,3-dicarboxylate, 2-propylheptyl isononyl cyclohexane-1,3-dicarboxylate, n-decyl isononyl cyclohexane-1,3-dicarboxylate, isodecyl isononyl cyclohexane-1,3-dicarboxylate, n-undecyl isononyl cyclohexane-1,3-dicarboxylate, isoundecyl isononyl cyclohexane-1,3-dicarboxylate, n-dodecyl isononyl cyclohexane-1,3-dicarboxylate, isododecyl isononyl cyclohexane-1,3-dicarboxylate, n-tridecyl isononyl cyclohexane-1,3- dicarboxylate, isotridecyl isononyl cyclohexane-1,3-dicarboxylate, n-decyl 2-propylheptyl cyclohexane-1,3-dicarboxylate, isodecyl 2-propylheptyl cyclohexane-1,3-dicarboxylate, n-undecyl 2-propylheptyl cyclohexane-1,3-dicarboxylate, isoundecyl 2-propylheptyl cyclohexane-1,3-dicarboxylate, n-dodecyl 2-propylheptyl cyclohexane-1,3-dicarboxylate, isododecyl 2-propylheptyl cyclohexane-1,3-dicarboxylate, n-tridecyl 2-propylheptyl cyclohexane-1,3-dicarboxylate, isotridecyl 2-propylheptyl cyclohexane-1,3-dicarboxylate, isodecyl n-decyl cyclohexane-1,3-dicarboxylate, n-undecyl n-decyl cyclohexane-1,3-dicarboxylate, isoundecyl n-decyl cyclohexane-1,3-dicarboxylate, n-dodecyl n-decyl cyclohexane-1,3-dicarboxylate, isododecyl n-decyl cyclohexane-1,3-dicarboxylate, n-tridecyl n-decyl cyclohexane-1,3-dicarboxylate, isotridecyl n-decyl cyclohexane-1,3-dicarboxylate, n-undecyl isodecyl cyclohexane-1,3-dicarboxylate, isoundecyl isodecyl cyclohexane-1,3-dicarboxylate, n-dodecyl isodecyl cyclohexane-1,3-dicarboxylate, isododecyl isodecyl cyclohexane-1,3-dicarboxylate, n-tridecyl isodecyl cyclohexane-1,3-dicarboxylate, isotridecyl isodecyl cyclohexane-1,3-dicarboxylate, isoundecyl n-undecyl cyclohexane-1,3-dicarboxylate, n-dodecyl n-undecyl cyclohexane-1,3-dicarboxylate, isododecyl n-undecyl cyclohexane-1,3-dicarboxylate, n-tridecyl n-undecyl cyclohexane-1,3-dicarboxylate, isotridecyl n-undecyl cyclohexane-1,3-dicarboxylate, n-dodecyl isoundecyl cyclohexane-1,3-dicarboxylate, isododecyl isoundecyl cyclohexane-1,3-dicarboxylate, n-tridecyl isoundecyl cyclohexane-1,3-dicarboxylate, isotridecyl isoundecyl cyclohexane-1,3-dicarboxylate, isododecyl n-dodecyl cyclohexane-1,3-dicarboxylate, n-tridecyl n-dodecyl cyclohexane-1,3-dicarboxylate, isotridecyl n-dodecyl cyclohexane-1,3-dicarboxylate, n-tridecyl isododecyl cyclohexane-1,3-dicarboxylate, isotridecyl isododecyl cyclohexane-1,3-dicarboxylate, isotridecyl n-tridecyl cyclohexane-1,3-dicarboxylate, methyl cyclohexyl cyclohexane-1,3-dicarboxylate, ethyl cyclohexyl cyclohexane-1,3-dicarboxylate, n-propyl cyclohexyl cyclohexane-1,3-dicarboxylate, isopropyl cyclohexyl cyclohexane-1,3-dicarboxylate, n-butyl cyclohexyl cyclohexane-1,3-dicarboxylate, tert-butyl cyclohexyl cyclohexane-1,3-dicarboxylate, isobutyl cyclohexyl cyclohexane-1,3-dicarboxylate, glycol cyclohexyl cyclohexane-1,3-dicarboxylate, n-hexyl cyclohexyl cyclohexane-1,3-dicarboxylate, isohexyl cyclohexyl cyclohexane-1,3-dicarboxylate, n-heptyl cyclohexyl cyclohexane-1,3-dicarboxylate, isoheptyl cyclohexyl cyclohexane-1,3-dicarboxylate, n-octyl -cyclohexyl cyclohexane-1,3-dicarboxylate, isooctyl cyclohexyl cyclohexane-1,3-dicarboxylate, 2-ethylhexyl cyclohexyl cyclohexane-1,3-dicarboxylate, n-nonyl -cyclohexyl cyclohexane-1,3-dicarboxylate, isononyl cyclohexyl cyclohexane-1,3-dicarboxylate, 2-propylheptyl cyclohexyl cyclohexane-1,3-dicarboxylate, n-decyl-cyclohexyl cyclohexane-1,3-dicarboxylate, isodecyl cyclohexyl cyclohexane-1,3-dicarboxylate, n-undecyl cyclohexyl cyclohexane-1,3-dicarboxylate, isoundecyl-cyclohexyl cyclohexane-1,3-dicarboxylate, n-dodecyl cyclohexyl cyclohexane-1,3-dicarboxylate, isododecyl cyclohexyl cyclohexane-1,3-dicarboxylate, n-tridecyl-cyclohexyl cyclohexane-1,3-dicarboxylate, isotridecyl cyclohexyl cyclohexane-1,3-dicarboxylate, methyl isopentyl cyclohexane-1,3-dicarboxylate, ethyl isopentyl-cyclohexane-1,3-dicarboxylate, n-propyl isopentyl cyclohexane-1,3-dicarboxylate, isopropyl isopentyl cyclohexane-1,3-dicarboxylate, n-butyl isopentyl cyclohexane-1,3-dicarboxylate, tert-butyl isopentyl cyclohexane-1,3-dicarboxylate, isobutyl isopentyl cyclohexane-1,3-dicarboxylate, glycol isopentyl cyclohexane-1,3-dicarboxylate, n-hexyl isopentyl cyclohexane-1,3-dicarboxylate, isohexyl isopentyl cyclohexane-1,3-dicarboxylate, n-heptyl isopentyl cyclohexane-1,3-dicarboxylate, isoheptyl isopentyl cyclohexane-1,3-dicarboxylate, n-octyl isopentyl cyclohexane-1,3-dicarboxylate, isooctyl isopentyl cyclohexane-1,3-dicarboxylate, 2-ethylhexyl isopentyl cyclohexane-1,3-dicarboxylate, n-nonyl isopentyl cyclohexane-1,3-dicarboxylate, isononyl isopentyl cyclohexane-1,3-dicarboxylate, 2-propylheptyl isopentyl cyclohexane-1,3-dicarboxylate, n-decyl isopentyl cyclohexane-1,3-dicarboxylate, isodecyl isopentyl cyclohexane-1,3-dicarboxylate, n-undecyl isopentyl cyclohexane-1,3-dicarboxylate, isoundecyl isopentyl cyclohexane-1,3-dicarboxylate, n-dodecyl isopentyl cyclohexane-1,3-dicarboxylate, isododecyl isopentyl cyclohexane-1,3-dicarboxylate, n-tridecyl isopentyl cyclohexane-1,3-dicarboxylate, isotridecyl isopentyl cyclohexane-1,3-dicarboxylate, methyl n-pentyl cyclohexane-1,3-dicarboxylate, ethyl n-pentyl cyclohexane-1,3-dicarboxylate, n-propyl n-pentyl cyclohexane-1,3-dicarboxylate, isopropyl n-pentyl cyclohexane-1,3-dicarboxylate, n-butyl n-pentyl cyclohexane-1,3-dicarboxylate, tert-butyl n-pentyl cyclohexane-1,3-dicarboxylate, isobutyl n-pentyl cyclohexane-1,3-dicarboxylate, glycol n-pentyl cyclohexane-1,3-dicarboxylate, n-hexyl n-pentyl cyclohexane-1,3-dicarboxylate, isohexyl n-pentyl cyclohexane-1,3-dicarboxylate, n-heptyl n-pentyl cyclohexane-1,3-dicarboxylate, isoheptyl n-pentyl cyclohexane-1,3-dicarboxylate, n-octyl n-pentyl cyclohexane-1,3-dicarboxylate, isooctyl n-pentyl cyclohexane-1,3-dicarboxylate, 2-ethylhexyl n-pentyl cyclohexane-1,3-dicarboxylate, n-nonyl n-pentyl cyclohexane-1,3-dicarboxylate, isononyl n-pentyl cyclohexane-1,3-dicarboxylate, 2-propylheptyl n-pentyl cyclohexane-1,3-dicarboxylate, n-decyl n-pentyl cyclohexane-1,3-dicarboxylate, isodecyl n-pentyl cyclohexane-1,3-dicarboxylate, n-undecyl n-pentyl cyclohexane-1,3-dicarboxylate, isoundecyl n-pentyl cyclohexane-1,3-dicarboxylate, n-dodecyl n-pentyl cyclohexane-1,3-dicarboxylate, isododecyl n-pentyl cyclohexane-1,3-dicarboxylate, n-tridecyl n-pentyl cyclohexane-1,3-dicarboxylate, isotridecyl n-pentyl cyclohexane-1,3-dicarboxylate;

mixed esters of cyclohexane-1,4-dicarboxylic acid with $C_1$-$C_{13}$ alcohols, e.g. ethyl methyl cyclohexane-1,4-dicarboxylate, n-propyl methyl cyclohexane-1,4-dicarboxylate, isopropyl methyl cyclohexane-1,4-dicarboxylate, n-butyl methyl cyclohexane-1,4-dicarboxylate, tert-butyl methyl cyclohexane-1,4-dicarboxylate, isobutyl methyl cyclohexane-1,4-dicarboxylate, glycol methyl cyclohexane-1,4-dicarboxylate, n-hexyl methyl cyclohexane-1,4-dicarboxylate, isohexyl methyl cyclohexane-1,4-dicarboxylate, n-heptyl methyl cyclohexane-1,4-dicarboxylate, isoheptyl methyl cyclohexane-1,4-dicarboxylate, n-octyl methyl cyclohexane-1,4-dicarboxylate, isooctyl methyl cyclohexane-1,4-dicarboxylate, 2-ethylhexyl methyl cyclohexane-1,4-dicarboxylate, n-nonyl methyl cyclohexane-1,4-dicarboxylate, isononyl methyl cyclohexane-1,4-dicarboxylate, 2-propylheptyl methyl cyclohexane-1,4-dicarboxylate, n-decyl methyl cyclohexane-1,4- dicarboxylate, isodecyl methyl cyclohexane-1,4-dicarboxylate, n-undecyl methyl cyclohexane-1,4-dicarboxylate, isoundecyl methyl cyclohexane-1,4-dicarboxylate, n-dodecyl methyl cyclohexane-1,4-dicarboxylate, isododecyl methyl cyclohexane-1,4-dicarboxylate, n-tridecyl methyl cyclohexane-1,4-dicarboxylate, isotridecyl methyl cyclohexane-1,4-dicarboxylate, n-propyl ethyl cyclohexane-1,4-dicarboxylate, isopropyl ethyl cyclohexane-1,4-dicarboxylate, n-butyl ethyl cyclohexane-1,4-dicarboxylate, tert-butyl ethyl cyclohexane-1,4-dicarboxylate, isobutyl ethyl cyclohexane-1,4-dicarboxylate, glycol ethyl cyclohexane-1,4-dicarboxylate, n-hexyl ethyl cyclohexane-1,4-dicarboxylate, isohexyl ethyl cyclohexane-1,4-dicarboxylate, n-heptyl ethyl cyclohexane-1,4-dicarboxylate, isoheptyl ethyl cyclohexane-1,4-dicarboxylate, n-octyl ethyl cyclohexane-1,4-dicarboxylate, isooctyl ethyl cyclohexane-1,4-dicarboxylate, 2-ethylhexyl ethyl cyclohexane-1,4-dicarboxylate, n-nonyl ethyl cyclohexane-1,4-dicarboxylate, isononyl ethyl cyclohexane-1,4-dicarboxylate, 2-propylheptyl ethyl cyclohexane-1,4-dicarboxylate, n-decyl ethyl cyclohexane-1,4-dicarboxylate, isodecyl ethyl cyclohexane-1,4-dicarboxylate, n-undecyl ethyl cyclohexane-1,4-dicarboxylate, isoundecyl ethyl cyclohexane-1,4-dicarboxylate, n-dodecyl ethyl cyclohexane-1,4-dicarboxylate, isododecyl ethyl cyclohexane-1,4-dicarboxylate, n-tridecyl ethyl cyclohexane-1,4-dicarboxylate, isotridecyl ethyl cyclohexane-1,4-dicarboxylate, isopropyl n-propyl cyclohexane-1,4-dicarboxylate, n-butyl n-propyl cyclohexane-1,4-dicarboxylate, tert-butyl n-propyl cyclohexane-1,4-dicarboxylate, isobutyl n-propyl cyclohexane-1,4-dicarboxylate, glycol n-propyl cyclohexane-1,4-dicarboxylate, n-hexyl n-propyl cyclohexane-1,4-dicarboxylate, isohexyl n-propyl cyclohexane-1,4-dicarboxylate, n-heptyl n-propyl cyclohexane-1,4-dicarboxylate, isoheptyl n-propyl cyclohexane-1,4-dicarboxylate, n-octyl n-propyl cyclohexane-1,4-dicarboxylate, isooctyl n-propyl cyclohexane-1,4-dicarboxylate, 2-ethylhexyl n-propyl cyclohexane-1,4-dicarboxylate, n-nonyl n-propyl cyclohexane-1,4-dicarboxylate, isononyl n-propyl cyclohexane-1,4-dicarboxylate, 2-propylheptyl n-propyl cyclohexane-1,4-dicarboxylate, n-decyl n-propyl cyclohexane-1,4-dicarboxylate, isodecyl n-propyl cyclohexane-1,4-dicarboxylate, n-undecyl n-propyl cyclohexane-1,4-dicarboxylate, isoundecyl n-propyl cyclohexane-1,4-dicarboxylate, n-dodecyl n-propyl cyclohexane-1,4-dicarboxylate, isododecyl n-propyl cyclohexane-1,4-dicarboxylate, n-tridecyl n-propyl cyclohexane-1,4-dicarboxylate, isotridecyl n-propyl cyclohexane-1,4-dicarboxylate, n-butyl isopropyl cyclohexane-1,4-dicarboxylate, tert-butyl isopropyl cyclohexane-1,4-dicarboxylate, isobutyl isopropyl cyclohexane-1,4-dicarboxylate, glycol isopropyl cyclohexane-1,4-dicarboxylate, n-hexyl isopropyl cyclohexane-1,4-dicarboxylate, isohexyl isopropyl cyclohexane-1,4-dicarboxylate, n-heptyl isopropyl cyclohexane-1,4-dicarboxylate, isoheptyl isopropyl cyclohexane-1,4-dicarboxylate, n-octyl isopropyl cyclohexane-1,4-dicarboxylate, isooctyl isopropyl cyclohexane-1,4-dicarboxylate, 2-ethylhexyl isopropyl cyclohexane-1,4-dicarboxylate, n-nonyl isopropyl cyclohexane-1,4-dicarboxylate, isononyl isopropyl cyclohexane-1,4-dicarboxylate, 2-propylheptyl isopropyl cyclohexane-1,4-dicarboxylate, n-decyl isopropyl cyclohexane-1,4-dicarboxylate, isodecyl isopropyl cyclohexane-1,4-dicarboxylate, n-undecyl isopropyl cyclohexane-1,4-dicarboxylate, isoundecyl isopropyl cyclohexane-1,4-dicarboxylate, n-dodecyl isopropyl cyclohexane-1,4-dicarboxylate, isododecyl isopropyl cyclohexane-1,4-dicarboxylate, n-tridecyl isopropyl cyclohexane-1,4-dicarboxylate, isotridecyl isopropyl cyclohexane-1,4-dicarboxylate, tert-butyl n-butyl cyclohexane-1,4-dicarboxylate, isobutyl n-butyl cyclohexane-1,4-dicarboxylate, glycol n-butyl cyclohexane-1,4-dicarboxylate, n-hexyl n-butyl cyclohexane-1,4-dicarboxylate, isohexyl n-butyl cyclohexane-1,4-dicarboxylate, n-heptyl n-butyl cyclohexane-1,4-dicarboxylate, isoheptyl n-butyl cyclohexane-1,4-dicarboxylate, n-octyl n-butyl cyclohexane-1,4-dicarboxylate, isooctyl n-butyl cyclohexane-1,4-dicarboxylate, 2-ethylhexyl n-butyl cyclohexane-1,4-dicarboxylate, n-nonyl n-butyl cyclohexane-1,4-dicarboxylate, isononyl n-butyl cyclohexane-1,4-dicarboxylate, 2-propylheptyl n-butyl cyclohexane-1,4-dicarboxylate, n-decyl n-butyl cyclohexane-1,4-dicarboxylate, isodecyl n-butyl cyclohexane-1,4-dicarboxylate, n-undecyl n-butyl cyclohexane-1,4-dicarboxylate, isoundecyl n-butyl cyclohexane-1,4-dicarboxylate, n-dodecyl n-butyl cyclohexane-1,4-dicarboxylate, isododecyl n-butyl cyclohexane-1,4-dicarboxylate, n-tridecyl n-butyl cyclohexane-1,4-dicarboxylate, isotridecyl n-butyl cyclohexane-1,4-dicarboxylate, isobutyl tert-butyl cyclohexane-1,4-dicarboxylate, glycol tert-butyl cyclohexane-1,4-dicarboxylate, n-hexyl tert-butyl cyclohexane-1,4-dicarboxylate, isohexyl tert-butyl cyclohexane-1,4-dicarboxylate, n-heptyl tert-butyl cyclohexane-1,4-dicarboxylate, isoheptyl tert-butyl cyclohexane-1,4-dicarboxylate, n-octyl tert-butyl cyclohexane-1,4-dicarboxylate, isooctyl tert-butyl cyclohexane-1,4-dicarboxylate, 2-ethylhexyl tert-butyl cyclohexane-1,4-dicarboxylate, n-nonyl tert-butyl cyclohexane-1,4-dicarboxylate, isononyl tert-butyl cyclohexane-1,4-dicarboxylate, 2-propylheptyl tert-butyl cyclohexane-1,4-dicarboxylate, n-decyl tert-butyl cyclohexane-1,4-dicarboxylate, isodecyl tert-butyl cyclohexane-1,4-dicarboxylate, n-undecyl tert-butyl cyclohexane-1,4-dicarboxylate, isoundecyl tert-butyl cyclohexane-1,4-dicarboxylate, n-dodecyl tert-butyl cyclohexane-1,4-dicarboxylate, isododecyl tert-butyl cyclohexane-1,4-dicarboxylate, n-tridecyl tert-butyl cyclohexane-1,4-dicarboxylate, isotridecyl tert-butyl cyclohexane-1,4-dicarboxylate, glycol isobutyl cyclohexane-1,4-dicarboxylate, n-hexyl isobutyl cyclohexane-1,4-dicarboxylate, isohexyl isobutyl cyclohexane-1,4-dicarboxylate, n-heptyl isobutyl cyclohexane-1,4-dicarboxylate, isoheptyl isobutyl cyclohexane-1,4-dicarboxylate, n-octyl isobutyl cyclohexane-1,4-dicarboxylate, isooctyl isobutyl cyclohexane-1,4-dicarboxylate, 2-ethylhexyl isobutyl cyclohexane-1,4-dicarboxylate, n-nonyl isobutyl cyclohexane-1,4-dicarboxylate, isononyl isobutyl cyclohexane-1,4-dicarboxylate, 2-propylheptyl isobutyl cyclohexane-1,4-dicarboxylate, n-decyl isobutyl cyclohexane-1,4-dicarboxylate, isodecyl isobutyl cyclohexane-1,4-dicarboxylate, n-undecyl isobutyl cyclohexane-1,4-dicarboxylate, isoundecyl isobutyl cyclohexane-1,4-dicarboxylate, n-dodecyl isobutyl cyclohexane-1,4-dicarboxylate, isododecyl isobutyl cyclohexane-1,4- dicarboxylate, n-tridecyl isobutyl cyclohexane-1,4-dicarboxylate, isotridecyl isobutyl cyclohexane-1,4-dicarboxylate, n-hexyl glycol cyclohexane-1,4-dicarboxylate, isohexyl glycol cyclohexane-1,4-dicarboxylate, n-heptyl glycol cyclohexane-1,4-dicarboxylate, isoheptyl glycol cyclohexane-1,4-dicarboxylate, n-octyl glycol cyclohexane-1,4-dicarboxylate, isooctyl glycol cyclohexane-1,4-dicarboxylate, 2-ethylhexyl glycol cyclohexane-1,4-dicarboxylate, n-nonyl glycol cyclohexane-1,4-dicarboxylate, isononyl glycol cyclohexane-1,4-dicarboxylate, 2-propylheptyl glycol cyclohexane-1,4-dicarboxylate, n-decyl glycol cyclohexane-1,4-dicarboxylate, isodecyl glycol cyclohexane-1,4-dicarboxylate, n-undecyl glycol cyclohexane-1,4-dicarboxylate, isoundecyl glycol cyclohexane-1,4-dicarboxylate, n-dodecyl glycol cyclohexane-1,4-dicarboxylate, isododecyl glycol cyclohexane-1,4-dicarboxylate, n-tridecyl glycol cyclohexane-1,4-dicarboxylate, isotridecyl glycol cyclohexane-1,4-dicarboxylate, isohexyl n-hexyl cyclohexane-1,4-dicarboxylate, n-heptyl n-hexyl cyclohexane-1,4-dicarboxylate, isoheptyl n-hexyl cyclohexane-1,4-dicarboxylate, n-octyl n-hexyl cyclohexane-1,4-dicarboxylate, isooctyl n-hexyl cyclohexane-1,4-dicarboxylate, 2-ethylhexyl n-hexyl cyclohexane-1,4-dicarboxylate, n-nonyl n-hexyl cyclohexane-1,4-dicarboxylate, isononyl n-hexyl cyclohexane-1,4-dicarboxylate, 2-propylheptyl n-hexyl cyclohexane-1,4-dicarboxylate, n-decyl n-hexyl cyclohexane-1,4-dicarboxylate, isodecyl n-hexyl cyclohexane-1,4-dicarboxylate, n-undecyl n-hexyl cyclohexane-1,4-dicarboxylate, isoundecyl n-hexyl cyclohexane-1,4-dicarboxylate, n-dodecyl n-hexyl cyclohexane-1,4-dicarboxylate, isododecyl n-hexyl cyclohexane-1,4-dicarboxylate, n-tridecyl n-hexyl cyclohexane-1,4-dicarboxylate, isotridecyl n-hexyl cyclohexane-1,4-dicarboxylate, n-heptyl isohexyl cyclohexane-1,4-dicarboxylate, isoheptyl isohexyl cyclohexane-1,4-dicarboxylate, n-octyl isohexyl cyclohexane-1,4-dicarboxylate, isooctyl isohexyl cyclohexane-1,4-dicarboxylate, 2-ethylhexyl isohexyl cyclohexane-1,4-dicarboxylate, n-nonyl isohexyl cyclohexane-1,4-dicarboxylate, isononyl isohexyl cyclohexane-1,4-dicarboxylate, 2-propylheptyl isohexyl cyclohexane-1,4-dicarboxylate, n-decyl isohexyl cyclohexane-1,4-dicarboxylate, isodecyl isohexyl cyclohexane-1,4-dicarboxylate, n-undecyl isohexyl cyclohexane-1,4-dicarboxylate, isoundecyl isohexyl cyclohexane-1,4-dicarboxylate, n-dodecyl isohexyl cyclohexane-1,4-dicarboxylate, isododecyl isohexyl cyclohexane-1,4-dicarboxylate, n-tridecyl isohexyl cyclohexane-1,4-dicarboxylate, isotridecyl isohexyl cyclohexane-1,4-dicarboxylate, isoheptyl n-heptyl cyclohexane-1,4-dicarboxylate, n-octyl n-heptyl cyclohexane-1,4-dicarboxylate, isooctyl n-heptyl cyclohexane-1,4-dicarboxylate, 2-ethylhexyl n-heptyl cyclohexane-1,4-dicarboxylate, n-nonyl n-heptyl cyclohexane-1,4-dicarboxylate, isononyl n-heptyl cyclohexane-1,4-dicarboxylate, 2-propylheptyl n-heptyl cyclohexane-1,4-dicarboxylate, n-decyl n-heptyl cyclohexane-1,4-dicarboxylate, isodecyl n-heptyl cyclohexane-1,4-dicarboxylate, n-undecyl n-heptyl cyclohexane-1,4-dicarboxylate, isoundecyl n-heptyl cyclohexane-1,4-dicarboxylate, n-dodecyl n-heptyl cyclohexane-1,4-dicarboxylate, isododecyl n-heptyl cyclohexane-1,4-dicarboxylate, n-tridecyl n-heptyl cyclohexane-1,4-dicarboxylate, isotridecyl n-heptyl cyclohexane-1,4-dicarboxylate, n-octyl isoheptyl cyclohexane-1,4-dicarboxylate, isooctyl isoheptyl cyclohexane-1,4-dicarboxylate, 2-ethylhexyl isoheptyl cyclohexane-1,4-dicarboxylate, n-nonyl isoheptyl cyclohexane-1,4-dicarboxylate, isononyl isoheptyl cyclohexane-1,4-dicarboxylate, 2-propylheptyl isoheptyl cyclohexane-1,4-dicarboxylate, n-decyl isoheptyl cyclohexane-1,4-dicarboxylate, isodecyl isoheptyl cyclohexane-1,4-dicarboxylate, n-undecyl isoheptyl cyclohexane-1,4-dicarboxylate, isoundecyl isoheptyl cyclohexane-1,4-dicarboxylate, n-dodecyl isoheptyl cyclohexane-1,4-dicarboxylate, isododecyl isoheptyl cyclohexane-1,4-dicarboxylate, n-tridecyl isoheptyl cyclohexane-1,4-dicarboxylate, isotridecyl isoheptyl cyclohexane-1,4-dicarboxylate, isooctyl n-octyl cyclohexane-1,4-dicarboxylate, 2-ethylhexyl n-octyl cyclohexane-1,4-dicarboxylate, n-nonyl n-octyl cyclohexane-1,4-dicarboxylate, isononyl n-octyl cyclohexane-1,4-dicarboxylate, 2-propylheptyl n-octyl cyclohexane-1,4-dicarboxylate, n-decyl n-octyl cyclohexane-1,4-dicarboxylate, isodecyl n-octyl cyclohexane-1,4-dicarboxylate, n-undecyl n-octyl cyclohexane-1,4-dicarboxylate, isoundecyl n-octyl cyclohexane-1,4-dicarboxylate, n-dodecyl n-octyl cyclohexane-1,4-dicarboxylate, isododecyl n-octyl cyclohexane-1,4-dicarboxylate, n-tridecyl n-octyl cyclohexane-1,4-dicarboxylate, isotridecyl n-octyl cyclohexane-1,4-dicarboxylate, 2-ethylhexyl isooctyl cyclohexane-1,4-dicarboxylate, n-nonyl isooctyl cyclohexane-1,4-dicarboxylate, isononyl isooctyl cyclohexane-1,4-dicarboxylate, 2-propylheptyl isooctyl cyclohexane-1,4-dicarboxylate, n-decyl isooctyl cyclohexane-1,4-dicarboxylate, isodecyl isooctyl cyclohexane-1,4-dicarboxylate, n-undecyl isooctyl cyclohexane-1,4-dicarboxylate, isoundecyl isooctyl cyclohexane-1,4-dicarboxylate, n-dodecyl isooctyl cyclohexane-1,4-dicarboxylate, isododecyl isooctyl cyclohexane-1,4-dicarboxylate, n-tridecyl isooctyl cyclohexane-1,4-dicarboxylate, isotridecyl isooctyl cyclohexane-1,4-dicarboxylate, n-nonyl 2-ethylhexyl cyclohexane-1,4-dicarboxylate, isononyl 2-ethylhexyl cyclohexane-1,4-dicarboxylate, 2-propylheptyl 2-ethylhexyl cyclohexane-1,4-dicarboxylate, n-decyl 2-ethylhexyl cyclohexane-1,4-dicarboxylate, isodecyl 2-ethylhexyl cyclohexane-1,4-dicarboxylate, n-undecyl 2-ethylhexyl cyclohexane-1,4-dicarboxylate, isoundecyl 2-ethylhexyl cyclohexane-1,4-dicarboxylate, n-dodecyl 2-ethylhexyl cyclohexane-1,4-dicarboxylate, isododecyl 2-ethylhexyl cyclohexane-1,4-dicarboxylate, n-tridecyl 2-ethylhexyl cyclohexane-1,4-dicarboxylate, isotridecyl 2-ethylhexyl cyclohexane-1,4-dicarboxylate, isononyl n-nonyl cyclohexane-1,4-dicarboxylate, 2-propylheptyl n-nonyl cyclohexane-1,4-dicarboxylate, n-decyl n-nonyl cyclohexane-1,4-dicarboxylate, isodecyl n-nonyl cyclohexane-1,4-dicarboxylate, n-undecyl n-nonyl cyclohexane-1,4-dicarboxylate, isoundecyl n-nonyl cyclohexane-1,4-dicarboxylate, n-dodecyl n-nonyl cyclohexane-1,4-dicarboxylate, isododecyl n-nonyl cyclohexane-1,4-dicarboxylate, n-tridecyl n-nonyl cyclohexane-1,4-dicarboxylate, isotridecyl n-nonyl cyclohexane-1,4-dicarboxylate, 2-propylheptyl isononyl cyclohexane-1,4-dicarboxylate, n-decyl isononyl cyclohexane-1,4-dicarboxylate, isodecyl isononyl cyclohexane-1,4-dicarboxylate, n-undecyl isononyl cyclohexane-1,4-dicarboxylate, isoundecyl isononyl cyclohexane-1,4-dicarboxylate, n-dodecyl isononyl cyclohexane-1,4- dicarboxylate, isododecyl isononyl cyclohexane-1,4-dicarboxylate, n-tridecyl isononyl cyclohexane-1,4-dicarboxylate, isotridecyl isononyl cyclohexane-1,4-dicarboxylate, n-decyl 2-propylheptyl cyclohexane-1,4-dicarboxylate, isodecyl 2-propylheptyl cyclohexane-1,4-dicarboxylate, n-undecyl 2-propylheptyl cyclohexane-1,4-dicarboxylate, isoundecyl 2-propylheptyl cyclohexane-1,4-dicarboxylate, n-dodecyl 2-propylheptyl cyclohexane-1,4-dicarboxylate, isododecyl 2-propylheptyl cyclohexane-1,4-dicarboxylate, n-tridecyl 2-propylheptyl cyclohexane-1,4-dicarboxylate, isotridecyl 2-propylheptyl cyclohexane-1,4-dicarboxylate, isodecyl n-decyl cyclohexane-1,4-dicarboxylate, n-undecyl n-decyl cyclohexane-1,4-dicarboxylate, isoundecyl n-decyl cyclohexane-1,4-dicarboxylate, n-dodecyl n-decyl cyclohexane-1,4-dicarboxylate, isododecyl n-decyl cyclohexane-1,4-dicarboxylate, n-tridecyl n-decyl cyclohexane-1,4-dicarboxylate, isotridecyl n-decyl cyclohexane-1,4-dicarboxylate, n-undecyl isodecyl cyclohexane-1,4-dicarboxylate, isoundecyl isodecyl cyclohexane-1,4-dicarboxylate, n-dodecyl isodecyl cyclohexane-1,4-dicarboxylate, isododecyl isodecyl cyclohexane-1,4-dicarboxylate, n-tridecyl isodecyl cyclohexane-1,4-dicarboxylate, isotridecyl isodecyl cyclohexane-1,4-dicarboxylate, isoundecyl n-undecyl cyclohexane-1,4-dicarboxylate, n-dodecyl n-undecyl cyclohexane-1,4-dicarboxylate, isododecyl n-undecyl cyclohexane-1,4-dicarboxylate, n-tridecyl n-undecyl cyclohexane-1,4-dicarboxylate, isotridecyl n-undecyl cyclohexane-1,4-dicarboxylate, n-dodecyl isoundecyl cyclohexane-1,4-dicarboxylate, isododecyl isoundecyl cyclohexane-1,4-dicarboxylate, n-tridecyl isoundecyl cyclohexane-1,4-dicarboxylate, isotridecyl isoundecyl cyclohexane-1,4-dicarboxylate, isododecyl n-dodecyl cyclohexane-1,4-dicarboxylate, n-tridecyl n-dodecyl cyclohexane-1,4-dicarboxylate, isotridecyl n-dodecyl cyclohexane-1,4-dicarboxylate, n-tridecyl isododecyl cyclohexane-1,4-dicarboxylate, isotridecyl isododecyl cyclohexane-1,4-dicarboxylate, isotridecyl n-tridecyl cyclohexane-1,4-dicarboxylate, methyl cyclohexyl cyclohexane-1,4-dicarboxylate, ethyl cyclohexyl cyclohexane-1,4-dicarboxylate, n-propyl cyclohexyl cyclohexane-1,4-dicarboxylate, isopropyl cyclohexyl cyclohexane-1,4-dicarboxylate, n-butyl cyclohexyl cyclohexane-1,4-dicarboxylate, tert-butyl cyclohexyl cyclohexane-1,4-dicarboxylate, isobutyl cyclohexyl cyclohexane-1,4-dicarboxylate, glycol cyclohexyl cyclohexane-1,4-dicarboxylate, n-hexyl cyclohexyl cyclohexane-1,4-dicarboxylate, isohexyl cyclohexyl cyclohexane-1,4-dicarboxylate, n-heptyl cyclohexyl cyclohexane-1,4-dicarboxylate, isoheptyl cyclohexyl cyclohexane-1,4-dicarboxylate, n-octyl-cyclohexyl cyclohexane-1,4-dicarboxylate, isooctyl cyclohexyl cyclohexane-1,4-dicarboxylate, 2-ethylhexyl cyclohexyl cyclohexane-1,4-dicarboxylate, n-nonyl cyclohexyl cyclohexane-1,4-dicarboxylate, isononyl cyclohexyl cyclohexane-1,4-dicarboxylate, 2-propylheptyl cyclohexyl cyclohexane-1,4-dicarboxylate, n-decyl cyclohexyl cyclohexane-1,4-dicarboxylate, isodecyl cyclohexyl cyclohexane-1,4-dicarboxylate, n-undecyl cyclohexyl cyclohexane-1,4-dicarboxylate, isoundecyl-cyclohexyl cyclohexane-1,4-dicarboxylate, n-dodecyl cyclohexyl cyclohexane-1,4-dicarboxylate, isododecyl cyclohexyl cyclohexane-1,4-dicarboxylate, n-tridecyl cyclohexyl cyclohexane-1,4-dicarboxylate, isotridecyl cyclohexyl cyclohexane-1,4-dicarboxylate, methyl isopentyl cyclohexane-1,4-dicarboxylate, ethyl isopentyl cyclohexane-1,4-dicarboxylate, n-propyl isopentyl cyclohexane-1,4-dicarboxylate, isopropyl isopentyl cyclohexane-1,4-dicarboxylate, n-butyl isopentyl cyclohexane-1,4-dicarboxylate, tert-butyl isopentyl cyclohexane-1,4-dicarboxylate, isobutyl isopentyl cyclohexane-1,4-dicarboxylate, glycol isopentyl cyclohexane-1,4-dicarboxylate, n-hexyl isopentyl cyclohexane-1,4-dicarboxylate, isohexyl isopentyl cyclohexane-1,4-dicarboxylate, n-heptyl isopentyl cyclohexane-1,4-dicarboxylate, isoheptyl isopentyl cyclohexane-1,4-dicarboxylate, n-octyl isopentyl cyclohexane-1,4-dicarboxylate, isooctyl isopentyl cyclohexane-1,4-dicarboxylate, 2-ethylhexyl isopentyl cyclohexane-1,4-dicarboxylate, n-nonyl isopentyl cyclohexane-1,4-dicarboxylate, isononyl isopentyl cyclohexane-1,4-dicarboxylate, 2-propylheptyl isopentyl cyclohexane-1,4-dicarboxylate, n-decyl isopentyl cyclohexane-1,4-dicarboxylate, isodecyl isopentyl cyclohexane-1,4-dicarboxylate, n-undecyl isopentyl cyclohexane-1,4-dicarboxylate, isoundecyl isopentyl cyclohexane-1,4-dicarboxylate, n-dodecyl isopentyl cyclohexane-1,4-dicarboxylate, isododecyl isopentyl cyclohexane-1,4-dicarboxylate, n-tridecyl isopentyl cyclohexane-1,4-dicarboxylate, isotridecyl isopentyl cyclohexane-1,4-dicarboxylate, methyl n-pentyl cyclohexane-1,4-dicarboxylate, ethyl n-pentyl cyclohexane-1,4-dicarboxylate, n-propyl n-pentyl cyclohexane-1,4-dicarboxylate, isopropyl n-pentyl cyclohexane-1,4-dicarboxylate, n-butyl n-pentyl cyclohexane-1,4-dicarboxylate, tert-butyl n-pentyl cyclohexane-1,4-dicarboxylate, isobutyl n-pentyl cyclohexane-1,4-dicarboxylate, glycol n-pentyl cyclohexane-1,4-dicarboxylate, n-hexyl n-pentyl cyclohexane-1,4-dicarboxylate, isohexyl n-pentyl cyclohexane-1,4-dicarboxylate, n-heptyl n-pentyl cyclohexane-1,4-dicarboxylate, isoheptyl n-pentyl cyclohexane-1,4-dicarboxylate, n-octyl n-pentyl cyclohexane-1,4-dicarboxylate, isooctyl n-pentyl cyclohexane-1,4-dicarboxylate, 2-ethylhexyl n-pentyl cyclohexane-1,4-dicarboxylate, n-nonyl n-pentyl cyclohexane-1,4-dicarboxylate, isononyl n-pentyl cyclohexane-1,4-dicarboxylate, 2-propylheptyl n-pentyl cyclohexane-1,4-dicarboxylate, n-decyl n-pentyl cyclohexane-1,4-dicarboxylate, isodecyl n-pentyl cyclohexane-1,4-dicarboxylate, n-undecyl n-pentyl cyclohexane-1,4-dicarboxylate, isoundecyl n-pentyl cyclohexane-1,4-dicarboxylate, n-dodecyl n-pentyl cyclohexane-1,4-dicarboxylate, isododecyl n-pentyl cyclohexane-1,4-dicarboxylate, n-tridecyl n-pentyl cyclohexane-1,4-dicarboxylate, isotridecyl n-pentyl cyclohexane-1,4-dicarboxylate;

alkyl cyclohexane-1,3-dicarboxylates, e.g. monomethyl cyclohexane-1,3-dicarboxylate, dimethyl cyclohexane-1,3-dicarboxylate, diethyl cyclohexane-1,3-dicarboxylate, di-n-propyl cyclohexane-1,3-dicarboxylate, di-n-butyl cyclohexane-1,3-dicarboxylate, di-tert-butyl cyclohexane-1,3-dicarboxylate, diisobutyl cyclohexane-1,3-dicarboxylate, monoglycol cyclohexane-1,3-dicarboxylate, diglycol cyclohexane-1,3-dicarboxylate, di-n-octyl cyclohexane-1,3-dicarboxylate, diisooctyl cyclohexane-1,3-dicarboxylate, di-2-ethylhexyl cyclohexane-1,3-dicarboxylate, di-n-nonyl cyclohexane-1,3-dicarboxylate, diisononyl cyclohexane-1,3-dicarboxylate, di-n-decyl cyclohexane-1,3-dicarboxylate, diisodecyl cyclohexane-1,3-dicarboxylate, di-n-undecyl cyclohexane-1,3-dicarboxylate, diisododecyl cyclohexane-1,3-dicarboxylate, di-n-octadecyl cyclohexane-1,3-dicarboxylate, diisooctadecyl cyclohexane-1,3-dicarboxylate, di-n-eicosyl cyclohexane-1,3-dicarboxylate, monocyclohexyl cyclohexane-1,3-dicarboxylate, dicyclohexyl cyclohexane-1,3-dicarboxylate;

diisopropyl cyclohexane-1,3-dicarboxylate, di-n-hexyl cyclohexane-1,3-dicarboxylate, diisohexyl cyclohexane-1,3-dicarboxylate, di-n-heptyl cyclohexane-1,3-dicarboxylate, diisoheptyl cyclohexane-1,3-dicarboxylate, di-2-propylheptyl cyclohexane-1,3-dicarboxylate, diisoundecyl cyclohexane-1,3-dicarboxylate, di-n-dodecyl cyclohexane-1,3-dicarboxylate, di-n-tridecyl cyclohexane-1,2-dicarboxylate, diisotridecyl cyclohexane-1,3-dicarboxylate, di-n-pentyl cyclohexane-1,3-dicarboxylate, diisopentyl cyclohexane-1,3-dicarboxylate;

alkyl cyclohexane-1,2,4-tricarboxylates, e.g. monomethyl cyclohexane-1,2,4-tricarboxylate, dimethyl cyclohexane-1,2,4-tricarboxylate, diethyl cyclohexane-1,2,4-tricarboxylate, di-n-propyl cyclohexane-1,2,4-tricarboxylate, diisopropyl cyclohexane-1,2,4-tricarboxylate, di-n-butyl cyclohexane-1,2,4-tricarboxylate, di-tert-butyl cyclohexane-1,2,4-tricarboxylate, diisobutyl cyclohexane-1,2,4-tricarboxylate, monoglycol cyclohexane-1,2,4-tricarboxylate, diglycol cyclohexane-1,2,4-tricarboxylate, di-n-octyl cyclohexane-1,2,4-tricarboxylate, diisooctyl cyclohexane-1,2,4-tricarboxylate, di-2-ethylhexyl cyclohexane-1,2,4-tricarboxylate, di-n-nonyl cyclohexane-1,2,4-tricarboxylate, diisononyl cyclohexane-1,2,4-tricarboxylate, di-n-decyl cyclohexane-1,2,4-tricarboxylate, diisodecyl cyclohexane-1,2,4-tricarboxylate, di-n-undecyl cyclohexane-1,2,4-tricarboxylate, diisododecyl cyclohexane-1,2,4-tricarboxylate, di-n-octadecyl cyclohexane-1,2,4-tricarboxylate, diisooctadecyl cyclohexane-1,2,4-tricarboxylate, di-n-eicosyl cyclohexane-1,2,4-tricarboxylate, monocyclohexyl cyclohexane-1,2,4-tricarboxylate, dicyclohexyl cyclohexane-1,2,4-tricarboxylate, and trimethyl cyclohexane-1,2,4-tricarboxylate, triethyl cyclohexane-1,2,4-tricarboxylate, tri-n-propyl cyclohexane-1,2,4-tricarboxylate, tri-n-butyl cyclohexane-1,2,4-tricarboxylate, tri-tert-butyl cyclohexane-1,2,4-tricarboxylate, triisobutyl cyclohexane-1,2,4-tricarboxylate, triglycol cyclohexane-1,2,4-tricarboxylate, tri-n-octyl cyclohexane-1,2,4-tricarboxylate, triisooctyl cyclohexane-1,2,4-tricarboxylate, tri-2-ethylhexyl cyclohexane-1,2,4-tricarboxylate, tri-n-nonyl cyclohexane-1,2,4-tricarboxylate, triisononyl cyclohexane-1,2,4-tricarboxylate, tri-n-decyl cyclohexane-1,2,4-tricarboxylate, triisododecyl cyclohexane-1,2,4-tricarboxylate, tri-n-undecyl cyclohexane-1,2,4-tricarboxylate, triisododecyl cyclohexane-1,2,4-tricarboxylate, tri-n-octadecyl cyclohexane-1,2,4-tricarboxylate, triisooctadecyl cyclohexane-1,2,4-tricarboxylate, tri-n-eicosyl cyclohexane-1,2,4-tricarboxylate, tricyclohexyl cyclohexane-1,2,4-tricarboxylate, di-n-hexyl cyclohexane-1,2,4-tricarboxylate, diisohexyl cyclohexane-1,2,4-tricarboxylate, tri-n-hexyl cyclohexane-1,2,4-tricarboxylate, triisohexyl cyclohexane-1,2,4-tricarboxylate, di-n-heptyl cyclohexane-1,2,4-tricarboxylate, diisoheptyl cyclohexane-1,2,4-tricarboxylate, tri-n-heptyl cyclohexane-1,2,4-tricarboxylate, triisoheptyl cyclohexane-1,2,4-tricarboxylate, di-n-pentyl cyclohexane-1,2,4-tricarboxylate, diisopentyl cyclohexane-1,2,4-tricarboxylate, tri-n-pentyl cyclohexane-1,2,4-tricarboxylate, triisopentyl cyclohexane-1,2,4-tricarboxylate, di-n-tridecyl cyclohexane-1,2,4-tricarboxylate, diisotridecyl cyclohexane-1,2,4-tricarboxylate, tri-n-tridecyl cyclohexane-1,2,4-tricarboxylate, triisotridecyl cyclohexane-1,2,4-tricarboxylate, di-n-dodecyl cyclohexane-1,2,4-tricarboxylate, diisoundecyl cyclohexane-1,2,4-tricarboxylate, tri-n-dodecyl cyclohexane-1,2,4-tricarboxylate, triisoundecyl cyclohexane-1,2,4-tricarboxylate, triisopropyl cyclohexane-1,2,4-tricarboxylate;

alkyl cyclohexane-1,3,5-tricarboxylates, e.g. monomethyl cyclohexane-1,3,5-tricarboxylate, dimethyl cyclohexane-1,3,5-tricarboxylate, diethyl cyclohexane-1,3,5-tricarboxylate, di-n-propyl cyclohexane-1,3,5-tricarboxylate, di-n-butyl cyclohexane-1,3,5-tricarboxylate, di-tert-butyl cyclohexane-1,3,5-tricarboxylate, diisobutyl cyclohexane-1,3,5-tricarboxylate, monoglycol cyclohexane-1,3,5-tricarboxylate, diglycol cyclohexane-1,3,5-tricarboxylate, di-n-octyl cyclohexane-1,3,5-tricarboxylate, diisooctyl cyclohexane-1,3,5-tricarboxylate, di-2-ethylhexyl cyclohexane-1,3,5-tricarboxylate, di-n-nonyl cyclohexane-1,3,5-tricarboxylate, diisononyl cyclohexane-1,3,5-tricarboxylate, di-n-decyl cyclohexane-1,3,5-tricarboxylate, diisodecyl cyclohexane-1,3,5-tricarboxylate, di-n-undecyl cyclohexane-1,3,5-tricarboxylate, diisododecyl cyclohexane-1,3,5-tricarboxylate, di-n-octadecyl cyclohexane-1,3,5-tricarboxylate, diisooctadecyl cyclohexane-1,3,5-tricarboxylate, di-n-eicosyl cyclohexane-1,3,5-tricarboxylate, monocyclohexyl cyclohexane-1,3,5-tricarboxylate, dicyclohexyl cyclohexane-1,3,5-tricarboxylate, and trimethyl cyclohexane-1,3,5-tricarboxylate, triethyl cyclohexane-1,3,5-tricarboxylate, tri-n-propyl cyclohexane-1,3,5-tricarboxylate, tri-n-butyl cyclohexane-1,3,5-tricarboxylate, tri-tert-butyl cyclohexane-1,3,5-tricarboxylate, triisobutyl cyclohexane-1,3,5-tricarboxylate, triglycol cyclohexane-1,3,5-tricarboxylate, tri-n-octyl cyclohexane-1,3,5-tricarboxylate, triisooctyl cyclohexane-1,3,5-tricarboxylate, tri-2-ethylhexyl cyclohexane-1,3,5-tricarboxylate, tri-n-nonyl cyclohexane-1,3,5-tricarboxylate, triisononyl cyclohexane-1,3,5-tricarboxylate, tri-n-decyl cyclohexane-1,3,5-tricarboxylate, triisododecyl cyclohexane-1,3,5-tricarboxylate, tri-n-undecyl cyclohexane-1,3,5-tricarboxylate, triisododecyl cyclohexane-1,3,5-tricarboxylate, tri-n-octadecyl cyclohexane-1,3,5-tricarboxylate, triisooctadecyl cyclohexane-1,3,5-tricarboxylate, tri-n-eicosyl cyclohexane-1,3,5-tricarboxylate, tricyclohexyl cyclohexane-1,3,5-tricarboxylate, di-n-hexyl cyclohexane-1,3,5-tricarboxylate, diisohexyl cyclohexane-1,3,5-tricarboxylate, tri-n-hexyl cyclohexane-1,3,5-tricarboxylate, triisohexyl cyclohexane-1,3,5-tricarboxylate, di-n-heptyl cyclohexane-1,3,5-tricarboxylate, diisoheptyl cyclohexane-1,3,5-tricarboxylate, tri-n-heptyl cyclohexane-1,3,5-tricarboxylate, triisoheptyl cyclohexane-1,3,5-tricarboxylate, di-n-pentyl cyclohexane-1,3,5-tricarboxylate, diisopentyl cyclohexane-1,3,5-tricarboxylate, tri-n-pentyl cyclohexane-1,3,5-tricarboxylate, triisopentyl cyclohexane-1,3,5-tricarboxylate, di-n-tridecyl cyclohexane-1,3,5-tricarboxylate, diisotridecyl cyclohexane-1,3,5-tricarboxylate, tri-n-tridecyl cyclohexane-1,3,5-tricarboxylate, triisotridecyl cyclohexane-1,3,5-tricarboxylate, di-n-dodecyl cyclohexane-1,3,5-tricarboxylate, diisoundecyl cyclohexane-1,3,5-tricarboxylate, tri-n-dodecyl cyclohexane-1,3,5-tricarboxylate, triisoundecyl cyclohexane-1,3,5-tricarboxylate, triisopropyl cyclohexane-1,3,5-tricarboxylate;

alkyl cyclohexane-1,2,3-tricarboxylates, e.g. monomethyl cyclohexane-1,2,3-tricarboxylate, dimethyl cyclohexane-1,2,3-tricarboxylate, diethyl cyclohexane-1,2,3-tricarboxylate, di-n-propyl cyclohexane-1,2,3-tricarboxylate, di-n-butyl cyclohexane-1,2,3-tricarboxylate, di-tert-butyl cyclohexane-1,2,3-tricarboxylate, diisobutyl cyclohexane-1,2,3-tricarboxylate, monoglycol cyclohexane-1,2,3-tricarboxylate, diglycol cyclohexane-1,2,3-tricarboxylate, di-n-octyl cyclohexane-1,2,3-tricarboxylate, diisooctyl cyclohexane-1,2,3-tricarboxylate, di-2-ethylhexyl cyclohexane-1,2,3-tricarboxylate, di-n-nonyl cyclohexane-1,2,3-tricarboxylate, diisononyl cyclohexane-1,2,3-tricarboxylate, di-n-decyl cyclohexane-1,2,3-tricarboxylate, diisodecyl cyclohexane-1,2,3-tricarboxylate, di-n-undecyl cyclohexane-1,2,3-tricarboxylate, diisododecyl cyclohexane-1,2,3-tricarboxylate, di-n-octadecyl cyclohexane-1,2,3-tricarboxylate, diisooctadecyl cyclohexane-1,2,3-tricarboxylate, di-n-eicosyl cyclohexane-1,2,3-tricarboxylate, monocyclohexyl cyclohexane-1,2,3-tricarboxylate, dicyclohexyl cyclohexane-1,2,3-tricarboxylate, and trimethyl cyclohexane-1,2,3-tricarboxylate, triethyl cyclohexane-1,2,3-tricarboxylate, tri-n-propyl cyclohexane-1,2,3-tricarboxylate, tri-n-butyl cyclohexane-1,2,3-tricarboxylate, tri-tert-butyl cyclohexane-1,2,3-tricarboxylate, triisobutyl cyclohexane-1,2,3-tricarboxylate, triglycol cyclohexane-1,2,3-tricarboxylate, tri-n-octyl cyclohexane-1,2,3-tricarboxylate, triisooctyl cyclohexane-1,2,3-tricarboxylate, tri-2-ethylhexyl cyclohexane-1,2,3-tricarboxylate, tri-n-nonyl cyclohexane-1,2,3-tricarboxylate, triisononyl cyclohexane-1,2,3-tricarboxylate, tri-n-decyl cyclohexane-1,2,3-tricarboxylate, triisododecyl cyclohexane-1,2,3-tricarboxylate, tri-n-undecyl cyclohexane-1,2,3-tricarboxylate, triisododecyl cyclohexane-1,2,3-tricarboxylate, tri-n-octadecyl cyclohexane-1,2,3-tricarboxylate, triisooctadecyl cyclohexane-1,2,3-tricarboxylate, tri-n-eicosyl cyclohexane-1,2,3-tricarboxylate, tricyclohexyl cyclohexane-1,2,3-tricarboxylate, di-n-hexyl cyclohexane-1,2,3-tricarboxylate, diisohexyl cyclohexane-1,2,3-tricarboxylate, tri-n-hexyl cyclohexane-1,2,3-tricarboxylate, triisohexyl cyclohexane-1,2,3-tricarboxylate, di-n-heptyl cyclohexane-1,2,3-tricarboxylate, diisoheptyl cyclohexane-1,2,3-tricarboxylate, tri-n-heptyl cyclohexane-1,2,3-tricarboxylate, triisoheptyl cyclohexane-1,2,3-tricarboxylate, di-n-pentyl cyclohexane-1,2,3-tricarboxylate, diisopentyl cyclohexane-1,2,3-tricarboxylate, tri-n-pentyl cyclohexane-1,2,3-tricarboxylate, triisopentyl cyclohexane-1,2,3-tricarboxylate, di-n-tridecyl cyclohexane-1,2,3-tricarboxylate, diisotridecyl cyclohexane-1,2,3-tricarboxylate, tri-n-tridecyl cyclohexane-1,2,3-tricarboxylate, triisotridecyl cyclohexane-1,2,3-tricarboxylate, di-n-dodecyl cyclohexane-1,2,3-tricarboxylate, diisoundecyl cyclohexane-1,2,3-tricarboxylate, tri-n-dodecyl cyclohexane-1,2,3-tricarboxylate, triisoundecyl cyclohexane-1,2,3-tricarboxylate, triisopropyl cyclohexane-1,2,3-tricarboxylate;

alkyl cyclohexane-1,2,4,5-tetracarboxylates, e.g. monomethyl cyclohexane-1,2,4,5-tetracarboxylate, dimethyl cyclohexane-1,2,4,5-tetracarboxylate, diethyl cyclohexane-1,2,4,5-tetracarboxylate, di-n-propyl cyclohexane-1,2,4,5-tetracarboxylate, di-n-butyl cyclohexane-1,2,4,5-tetracarboxylate, di-tert-butyl cyclohexane-1,2,4,5-tetracarboxylate, diisobutyl cyclohexane-1,2,4,5-tetracarboxylate, monoglycol cyclohexane-1,2,4,5-tetracarboxylate, diglycol cyclohexane-1,2,4,5-tetracarboxylate, di-n-octyl cyclohexane-1,2,4,5-tetracarboxylate, diisooctyl cyclohexane-1,2,4,5-tetracarboxylate, di-2-ethylhexyl cyclohexane-1,2,4,5-tetracarboxylate, di-n-nonyl cyclohexane-1,2,4,5-tetracarboxylate, diisononyl cyclohexane-1,2,4,5-tetracarboxylate, di-n-decyl cyclohexane-1,2,4,5-tetracarboxylate, diisodecyl cyclohexane-1,2,4,5-tetracarboxylate, di-n-undecyl cyclohexane-1,2,4,5-tetracarboxylate, diisododecyl cyclohexane-1,2,4,5-tetracarboxylate, di-n-octadecyl cyclohexane-1,2,4,5-tetracarboxylate, diisooctadecyl cyclohexane-1,2,4,5-tetracarboxylate, di-n-eicosyl cyclohexane-1,2,4,5-tetracarboxylate, monocyclohexyl cyclohexane-1,2,4,5-tetracarboxylate, trimethyl cyclohexane-1,2,4,5-tetracarboxylate, triethyl cyclohexane-1,2,4,5-tetracarboxylate, tri-n-propyl cyclohexane-1,2,4,5-tetracarboxylate, tri-n-butyl cyclohexane-1,2,4,5-tetracarboxylate, tri-tert-butyl cyclohexane-1,2,4,5-tetracarboxylate, triisobutyl cyclohexane-1,2,4,5-tetracarboxylate, triglycol cyclohexane-1,2,4,5-tetracarboxylate, tri-n-octyl cyclohexane-1,2,4,5-tetracarboxylate, triisooctyl cyclohexane-1,2,4,5-tetracarboxylate, tri-2-ethylhexyl cyclohexane-1,2,4,5-tetracarboxylate, tri-n-nonyl cyclohexane-1,2,4,5-tetracarboxylate, triisononyl cyclohexane-1,2,4,5-tetracarboxylate, tri-n-decyl cyclohexane-1,2,4,5-tetracarboxylate, triisododecyl cyclohexane-1,2,4,5-tetracarboxylate, tri-n-undecyl cyclohexane-1,2,4,5-tetracarboxylate, triisododecyl cyclohexane-1,2,4,5-tetracarboxylate, tri-n-octadecyl cyclohexane-1,2,4,5-tetracarboxylate, triisooctadecyl cyclohexane-1,2,4,5-tetracarboxylate, tri-n-eicosyl cyclohexane-1,2,4,5-tetracarboxylate, tricyclohexyl cyclohexane-1,2,4,5-tetracarboxylate, and tetramethyl cyclohexane-1,2,4,5-tetracarboxylate, tetraethyl cyclohexane-1,2,4,5-tetracarboxylate, tetra-n-propyl cyclohexane-1,2,4,5-tetracarboxylate, tetra-n-butyl cyclohexane-1,2,4,5-tetracarboxylate, tetra-tert-butyl cyclohexane-1,2,4,5-tetracarboxylate, tetraisobutyl cyclohexane-1,2,4,5-tetracarboxylate, tetraglycol cyclohexane-1,2,4,5-tetracarboxylate, tetra-n-octyl cyclohexane-1,2,4,5-tetracarboxylate, tetraisooctyl cyclohexane-1,2,4,5-tetracarboxylate, tetra-2-ethylhexyl cyclohexane-1,2,4,5-tetracarboxylate, tetra-n-nonyl cyclohexane-1,2,4,5-tetracarboxylate, tetraisononyl cyclohexane-1,2,4,5-tetracarboxylate, tetra-n-decyl cyclohexane-1,2,4,5-tetracarboxylate, tetraisodecyl cyclohexane-1,2,4,5-tetracarboxylate, tetraisododecyl cyclohexane-1,2,4,5-tetracarboxylate, tetra-n-undecyl cyclohexane-1,2,4,5-tetracarboxylate, tetra-n-octadecyl cyclohexane-1,2,4,5-tetracarboxylate, tetraisooctadecyl cyclohexane-1,2,4,5-tetracarboxylate, tetra-n-eicosyl cyclohexane-1,2,4,5-tetracarboxylate, tetracyclohexyl cyclohexane-1,2,4,5-tetracarboxylate, di-n-hexyl cyclohexane-1,2,4,5-tetracarboxylate, diisohexyl cyclohexane-1,2,4,5-tetracarboxylate, tri-n-hexyl cyclohexane-1,2,4,5-tetracarboxylate, triisohexyl cyclohexane-1,2,4,5-tetracarboxylate, di-n-heptyl cyclohexane-1,2,4,5-tetracarboxylate, diisoheptyl cyclohexane-1,2,4,5-tetracarboxylate, tri-n-heptyl cyclohexane-1,2,4,5-tetracarboxylate, triisoheptyl cyclohexane-1,2,4,5-tetracarboxylate, di-n-pentyl cyclohexane-1,2,4,5-tetracarboxylate, diisopentyl cyclohexane-1,2,4,5-tetracarboxylate, tri-n-pentyl cyclohexane-1,2,4,5-tetracarboxylate, triisopentyl cyclohexane-1,2,4,5-tetracarboxylate, di-n-tridecyl cyclohexane-1,2,4,5-tetracarboxylate, diisotridecyl cyclohexane-1,2,4,5-tetracarboxylate, tri-n-tridecyl cyclohexane-1,2,4,5-tetracarboxylate, triisotridecyl cyclohexane-1,2,4,5-tetracarboxylate, di-n-dodecyl cyclohexane-1,2,4,5-tetracarboxylate, diisoundecyl cyclohexane-1,2,4,5-tetracarboxylate, tri-n-dodecyl cyclohexane-1,2,4,5-tetracarboxylate, triisoundecyl cyclohexane-1,2,4,5-tetracarboxylate, triisopropyl cyclohexane-1,2,4,5-tetracarboxylate, tetra-n-hexyl cyclohexane-1,2,4,5-tetracarboxylate, tetraisohexyl cyclohexane-1,2,4,5-tetracarboxylate, tetra-n-heptyl cyclohexane-1,2,4,5-tetracarboxylate, tetraisoheptyl cyclohexane-1,2,4,5-tetracarboxylate, tetra-n-pentyl cyclohexane-1,2,4,5- tetracarboxylate, tetraisopentyl cyclohexane-1,2,4,5-tetracarboxylate, tetra-n-tridecyl cyclohexane-1,2,4,5-tetracarboxylate, tetraisotridecyl cyclohexane-1,2,4,5-tetracarboxylate, tetra-n-dodecyl cyclohexane-1,2,4,5-tetracarboxylate, tetraisoundecyl cyclohexane-1,2,4,5-tetracarboxylate, tetraisopropyl cyclohexane-1,2,4,5-tetracarboxylate;

anhydrides of cyclohexane-1,2-dicarboxylic acid, cyclohexane-1,2,4-tricarboxylic acid, cyclohexane-1,2,3-tricarboxylic acid and cyclohexane-1,2,4,5-tetracarboxylic acid.

The cyclohexane-1,2-dicarboxylates disclosed in WO 99/32427 are also suitable for the purposes of the present invention and are listed again below:

diisopentyl cyclohexane-1,2-dicarboxylate obtainable by hydrogenating diisopentyl phthalate with the Chemical Abstracts Registry Number (hereinafter: CAS No.) 84777-06-0;

diisoheptyl cyclohexane-1,2-dicarboxylate obtainable by hydrogenating diisoheptyl phthalate with the CAS No. 71888-89-6;

diisononyl cyclohexane-1,2-dicarboxylate obtainable by hydrogenating a diisononyl phthalate with the CAS No. 68515-48-0;

diisononyl cyclohexane-1,2-dicarboxylate obtainable by hydrogenating a diisononyl phthalate with the CAS No. 28553-12-0, based on n-butene;

diisononyl cyclohexane-1,2-dicarboxylate obtainable by hydrogenating a diisononyl phthalate with the CAS No. 28553-12-0, based on isobutene;

a di-C9 cyclohexane-1,2-dicarboxylate obtainable by hydrogenating a dinonyl phthalate with the CAS No. 68515-46-8;

a diisodecyl cyclohexane-1,2-dicarboxylate obtainable by hydrogenating a diisodecyl phthalate with the CAS No. 68515-49-1;

a di-C7-11 cyclohexane-1,2-dicarboxylate obtainable by hydrogenating the appropriate phthalate with the CAS No. 68515-42-4;

a di-C7-11 cyclohexane-1,2-dicarboxylate obtainable by hydrogenating the di C7-11 phthalates with the following CAS Nos:
111 381-89-6,
111 381 90-9,
111 381 91-0,
68515-44-6,
68515-45-7 and
3648-20-7;

a di-C9-11 cyclohexane-1,2-dicarboxylate obtainable by hydrogenating a di C9-11 phthalate with the CAS No. 98515-43-5;

a diisodecyl cyclohexane-1,2-dicarboxylate obtainable by hydrogenating a diisodecyl phthalate composed mainly of di-(2-propylheptyl) phthalate;

a di-C7-9 cyclohexane-1,2-dicarboxylate obtainable by hydrogenating the appropriate phthalate which has branched-chain or linear C7-9-alkylester groups; examples of phthalates which can be used as appropriate starting materials have the following CAS Nos:
di-C7,9-alkyl phthalate with the CAS No. 111 381-89-6;
di-C7-alkyl phthalate with the CAS No. 68515-44-6; and
di-C9-alkyl phthalate with the CAS No. 68515-45-7.

The content of WO 99/32427 relating inter alia to these compounds listed immediately above and to the preparation of benzenepolycarboxylic acids using specific macroporous catalysts is incorporated in its entirety into the present application by way of reference.

According to the invention it is also possible to use hydrogenation products of mixed phthalates with $C_{10}$ and $C_{13}$ alcohols, these being described in DE A 10032580.7.

Other suitable compounds for the purposes of the present invention are the hydrogenation products of the commercially available benzenecarboxylates with the trade names Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No. 27554-26-3), Jayflex UDP (CAS No. 68515-47-9), Jayflex DIUP (CAS No. 85507-79-5), Jayflex DTDP (CAS No. 68515-47-9), Jayflex L9P (CAS No. 68515-45-7), Jayflex L911P (CAS No. 68515-43-5), Jayflex L11P (CAS No. 3648-20-2), Witamol 110 (CAS No. 90193-91-2), Witamol 118 (di-n-C8-C10-alkyl phthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0).

In one preferred embodiment, the present invention therefore provides a one-part closure device where the at least one cyclohexanepolycarboxylic acid or the derivative thereof is selected from the group consisting of:

mixed esters of cyclohexane-1,2-dicarboxylic acid with $C_1$-$C_{13}$ alcohols;

monoesters of cyclohexane-1,2-dicarboxylic acid with $C_1$-$C_{13}$ alcohols;

diisopentyl cyclohexane-1,2-dicarboxylate obtainable by hydrogenating diisopentyl phthalate with the Chemical Abstracts Registry Number (hereinafter: CAS No.) 84777-06-0;

diisoheptyl cyclohexane-1,2-dicarboxylate obtainable by hydrogenating diisoheptyl phthalate with the CAS No. 71888-89-6;

diisononyl cyclohexane-1,2-dicarboxylate obtainable by hydrogenating a diisononyl phthalate with the CAS No. 68515-48-0;

diisononyl cyclohexane-1,2-dicarboxylate obtainable by hydrogenating a diisononyl phthalate with the CAS No. 28553-12-0, based on n-butene;

diisononyl cyclohexane-1,2-dicarboxylate obtainable by hydrogenating a diisononyl phthalate with the CAS No. 28553-12-0, based on isobutene;

a di-C9 cyclohexane-1,2-dicarboxylate obtainable by hydrogenating a dinonyl phthalate with the CAS No. 68515-46-8;

a diisodecyl cyclohexane-1,2-dicarboxylate obtainable by hydrogenating a diisodecyl phthalate with the CAS No. 68515-49-1;

a di-C7-11 cyclohexane-1,2-dicarboxylate obtainable by hydrogenating the appropriate phthalate with the CAS No. 68515 42-4;

a di-$C_{7-11}$ cyclohexane-1,2-dicarboxylate obtainable by hydrogenating the di-$C_{7-11}$ phthalates with the following CAS Nos:
111 381-89-6,
111 381 90-9,
111 381 91-0,
68515-44-6,
68515-45-7 and
3648-20-7;

a di-C9-11 cyclohexane-1,2-dicarboxylate obtainable by hydrogenating a di C9-11 phthalate with the CAS No. 98515-43-5;

a diisodecyl cyclohexane-1,2-dicarboxylate obtainable by hydrogenating a diisodecyl phthalate composed mainly of di-2-propylheptyl phthalate;

a di-C7-9 cyclohexane-1,2-dicarboxylate obtainable by hydrogenating the appropriate phthalate which has branched-chain or linear C7-9-alkylester groups; examples of phthalates which can be used as appropriate starting materials have the following CAS Nos:

di-C7,9-alkyl phthalate with the CAS No. 111 381-89-6;
di-C7-alkyl phthalate with the CAS No. 68515-44-6; and
di-C9-alkyl phthalate with the CAS No. 68515-45-7;

hydrogenation products of mixed phthalates with $C_{10}$ and $C_{13}$ alcohols;

the hydrogenation products of the commercially available benzenecarboxylates with the trade names Jayflex DINP (CAS No. 68515-48-0), Jayflex DIDP (CAS No. 68515-49-1), Palatinol 9-P, Vestinol 9 (CAS No. 28553-12-0), TOTM-I (CAS No. 3319-31-1), Linplast 68-TM, Palatinol N (CAS No. 28553-12-0), Jayflex DHP (CAS No. 68515-50-4), Jayflex DIOP (CAS No. 27554-26-3), Jayflex UDP (CAS No. 68515-47-9), Jayflex DIUP (CAS No. 85507-79-5), Jayflex DTDP (CAS No. 68515-47-9), Jayflex L9P (CAS No. 68515-45-7), Jayflex L911P (CAS No. 68515-43-5), Jayflex L11P (CAS No. 3648-20-2), Witamol 110 (CAS No. 90193-91-2), Witamol 118 (di-n-C8-C10-alkyl phthalate), Unimoll BB (CAS No. 85-68-7), Linplast 1012 BP (CAS No. 90193-92-3), Linplast 13 XP (CAS No. 27253-26-5), Linplast 610 P (CAS No. 68515-51-5), Linplast 68 FP (CAS No. 68648-93-1) and Linplast 812 HP (CAS No. 70693-30-0), Palatinol AH (CAS No. 117-81-7), Palatinol 711 (CAS No. 68515-42-4), Palatinol 911 (CAS No. 68515-43-5), Palatinol 11 (CAS No. 3648-20-2), Palatinol Z (CAS No. 26761-40-0) and Palatinol DIPP (CAS No. 84777-06-0), where the at least one cyclohexane polycarboxylic acid or the derivative thereof may be present in the form of cis-isomer or trans-isomer, or in the form of a mixture of cis- and trans-isomer.

The content (% by weight) of plasticizer in particular of cyclohexanepolycarboxylic acids or derivatives thereof, in the closure devices of the invention is from 1 to 80%, preferably from 5 to 55%, particularly preferably from 10 to 50%, and in particular from 15 to 45%. The cyclohexanepolycarboxylic acids or derivatives thereof may be present in the mixtures of the invention in the form of cis-isomer or in the form of trans-isomer or in the form of a mixture of cis- and trans-isomer.

If the closure device of the invention comprises a mixture of cis- and trans-isomer of a cyclohexanepolycarboxylic acid or of a derivative thereof, in particular of a cyclohexane-1,2-dicarboxylic acid or of a derivative thereof, it is preferable for the purposes of the present invention that the mixture of cis- and trans-isomer has a cis:trans isomer ratio of from 0:100 to 100:0, in particular from 70:30 to 99:1, particularly preferably from 80:20 to 95:5.

The desired isomer ratio of the cyclohexanepolycarboxylic acid or or the derivative thereof may be set during the preparation process, for example, e.g. by the temperature during preparation by hydrogenation. However, it is equally possible for the desired isomer ratio to be set by mixing the separate isomers.

For the purposes of the present invention, a particularly preferred plasticizer is diisononyl cyclohexane-1,2-dicarboxylate obtainable by hydrogenating a diisononyl phthalate with CAS No. 28553-12-0.

One preferred embodiment of the present invention therefore provides one-part closure devices where the cyclohexanedicarboxylic ester is diisononyl cyclohexane-1,2-dicarboxylate obtainable by hydrogenating a diisononyl phthalate with CAS No. 28553-12-0.

For the purposes of the present invention, the isononanol mixture used as starting material for the diisononyl cyclohexane-1,2-dicarboxylate of the invention, obtainable by hydrogenating a diisononyl phthalate with CAS No. 28553-12-0, and which is prepared from n-butene, may comprise 11.0% of nonanol, 20.8% of 6-methyloctanol, 20.5% of 4-methyloctanol, 5.3% of 2-methyloctanol, 8.7% of 3-ethylheptanol, 2.9% of 2-ethylheptanol, 2.7% of 2-propylhexanol, 6.2% of 4,5-dimethylheptanol, 11.0% of 2,5-dimethylheptanol, 2.8% of 2,3-dimethylheptanol, 1.6% of 3-ethyl-4-methylhexanol, 3.0% of 2-ethyl-4-methylhexanol, and 3.5% of other $C_9$ alcohols.

Depending on the content of plasticizers, a distinction is made between rigid PVC (<0.1% of plasticizers) and flexible PVC (>0.1% of plasticizers).

Polyvinyl chloride is obtained by homopolymerization of vinyl chloride. The polyvinyl chloride (PVC) used according to the invention may be prepared by suspension polymerization, microsuspension polymerization, emulsion polymerization, or bulk polymerization, for example. The preparation of PVC by polymerization of vinyl chloride, and also the preparation and composition of plasticized PVC, are described by way of example in "Becker/Braun, Kunstoff-Handbuch, Volume 2/1: Polyvinylchlorid" 2nd edition, Carl Hanser Verlag, Munich.

The K value which characterizes the molecular weight of the PVC used according to the invention, and is determined to DIN 53726, is from 57 to 90, preferably from 61 to 85, in particular from 64 to 75.

For the purposes of the invention, the content of PVC (% by weight) in the closure devices is from 20 to 99%, preferably from 45 to 95%, particularly preferably from 50 to 90%, and in particular from 55 to 85%.

Besides at least one plasticizer, in particular at least one cyclohexanedicarboxylic acid or a derivative thereof, and a polyvinyl chloride, the closure devices of the invention may also comprise other suitable additives. Examples of those which may be present are stabilizers, lubricants, fillers, pigments, flame retardants, light stabilizers, blowing agents, polymeric processing aids, impact modifiers, optical brighteners, antistats, and biostabilizers.

Some suitable additives are described in more detail below. However, the examples listed do not restrict the closure devices of the invention but serve merely for illustration. All content data are % by weight.

Stabilizers neutralize the hydrochloric acid liberated during and/or after processing of the PVC.

Stabilizers which may be used are any of the usual PVC stabilizers in solid or liquid form, such as conventional stabilizers based on Ca/Zn, on Ba/Zn, on Pb or on Sn, and also acid-binding phyllosilicates, such as hydrotalcite.

The closure devices of the invention may have a stabilizer content of from 0.05 to 7%, preferably from 0.1 to 5%, particularly preferably from 0.2 to 4%, and particularly from 0.5 to 3%.

Lubricants are intended to act between the PVC particles and to counteract frictional forces arising during mixing, plastication and shaping.

Lubricants which may be present in the mixtures for preparing the closure devices of the invention are any of the usual lubricants for processing plastics. Examples of those which may be used are hydrocarbons, such as oils, paraffins and PE waxes, fatty alcohols having from 6 to 20 carbon atoms, ketones, carboxylic acids, such as fatty acids and montanic acid, oxidized PE wax, metal salts of carboxylic acids, carboxamides, and also carboxylic esters, for example with the following alcohols: ethanol, fatty alcohols, glycerol, ethanediol, pentaerythritol, and with long-chain carboxylic acids as acid component.

The mixtures used for preparing the closure devices of the invention may have a lubricant content of from 0.01 to 10%, preferably from 0.05 to 5%, particularly preferably from 0.1 to 3%, particularly from 0.2 to 2%.

Fillers favorably affect especially the compressive strength, tensile strength and flexural strength, and also hardness and heat resistance of plasticized PVC.

For the purposes of the present invention, the closure devices may also comprise fillers, for example carbon black, or other inorganic fillers, such as naturally occurring calcium carbonates, e.g. chalk, limestone or marble, synthetic calcium carbonates, dolomite, silicates, silica, sand, diatomaceous earth, and aluminum silicates, such as kaolin, mica and feldspar. Fillers preferably used are calcium carbonates, chalk, dolomite, kaolin, silicates, talc or carbon black.

The closure devices of the invention may have a filler content of from 0.01 to 80%, preferably from 0.1 to 60%, particularly preferably from 0.5 to 50%, and particularly from 1 to 40%.

The closure devices of the invention may also comprise pigments in order to adapt the resultant product to various possible uses.

For the purposes of the present invention, either inorganic pigments or organic pigments may be used. Examples of inorganic pigments which may be used are cadmium pigments, such as CdS, cobalt pigments, such as CoO/Al2O3, and chromium pigments, such as Cr2O3. Examples of organic pigments which may be used are monoazo pigments, condensed azo pigments, azomethine pigments, anthraquinone pigments, quinacridones, phthalocyanine pigments, dioxazine pigments and aniline pigments.

The closure devices of the invention may have a pigment content of from 0.01 to 10%, preferably from 0.05 to 5%, particularly preferably from 0.1 to 3%, particularly from 0.5 to 2%.

The closure devices of the invention may also comprise flame retardants, in order to decrease flammability and to reduce smoke generation during combustion.

Examples of flame retardants which may be used are antimony trioxide, phosphoric esters, chloroparaffins, aluminum hydroxide, boron compounds, molybdenum trioxide, ferrocene, calcium carbonate and magnesium carbonate.

The closure devices of the invention may have a flame retardant content of from 0.01 to 10%, preferably from 0.1 to 8%, particularly preferably from 0.2 to 5%, and particularly from 0.5 to 3%.

The closure devices may also comprise light stabilizers in order to protect the closure devices of the invention from surface damage on exposure to light.

For the purposes of the present invention use may be made of hydroxybenzophenones or hydroxyphenylbenzotriazoles, for example.

The mixtures of the invention may have a light stabilizer content of from 0.01 to 7%, preferably from 0.1 to 5%, particularly preferably from 0.2 to 4%, and particularly from 0.5 to 3%.

For the purposes of the present invention, the closure devices of the invention may also comprise other plastics selected from the group consisting of homo- and copolymers based on ethylene, propylene, butadiene, vinyl acetate, glycidyl acrylate, glycidyl methacrylate, acrylates or methacrylates having alcohol components of branched or unbranched C1-C10 alcohols, styrene or acrylonitrile.

Examples which should be mentioned are polyacrylates with identical or different alcohol radicals from the group consisting of the $C_4$-$C_8$ alcohols, particularly of butanol, hexanol, octanol and 2-ethylhexanol, polymethyl methacrylate, methyl methacrylate-butyl acrylate copolymers, methyl methacrylate-butyl methacrylate copolymers, ethylene-vinyl acetate copolymers, chlorinated polyethylene, nitrile rubber, acrylonitrile-butadiene-styrene copolymers, ethylene-propylene copolymers, ethylene-propylene-diene copolymers, styrene-acrylonitrile copolymers, acrylonitrile-butadiene rubber, styrene-butadiene elastomers and methyl methacrylate-styrene-butadiene copolymers.

The present invention also provides a process for producing a one-part closure device encompassing at least polyvinyl chloride and at least one plasticizer, or encompassing at least polyvinyl chloride and at least one cyclohexanedicarboxylic acid or a derivative thereof, by bringing the components into contact with one another.

The plastisol process or thermoplastic processing methods are preferably used to produce the closure devices of the invention.

In one preferred embodiment, the present invention therefore provides a process for producing a one-part closure device by using a plastisol process to process the components.

The plastisol process first prepares a mixture from PVC powder, preferably paste-grade PVC, usually emulsion-grade PVCs, a plasticizer, and, where appropriate, a heat stabilizer, for example one based on Ca/Zn, a blowing agent, such as azodicarbonamide, and other additives, such as fillers, pigments, dyes, light stabilizers, antistats, and biostabilizers. Suitable homogenizing equipment, such as a 3-roll mill or a dissolver, is then used to convert the mixture to a paste, and it is then freed from any remaining air present (deaerated) under high vacuum.

The resultant plastisol is then cast in a suitable heat-resistant mold, preferably made from thick-walled metal, preheated to 200-220° C. After further heating, for example in a circulating-air drying cabinet, the mold together with the casting is removed at the end of the gelling period, determined empirically, and rapidly cooled to below 50° C., for example in a water bath. Performance tests are then carried out on the demolded casting.

As an alternative to chemically blown foam, it is also possible to use a foam (mechanically blown foam), blown mechanically by introducing gas.

In thermoplastic processing methods, a mixture is prepared from PVC powder, preferably PVC powder prepared by the suspension process, a plasticizer, and also, where appropriate, other additives, such as stabilizers, lubricants, fillers, pigments, dyes, flame retardants, light stabilizers, antistats, blowing agents, kickers, and biostabilizers. This mixture is homogenized in a high-speed fluid mixer and heated to sufficiently high temperatures above its dryness point by way of the frictional heat introduced. Care has to be taken that the temperature does not reach the initiation temperature for blowing agent decomposition.

The dry blend obtained is then further processed by thermoplastic methods, preferably in an extruder. In this process, the temperature, timings, and screw geometry should be adjusted to give the resultant extrudate an ideal cell structure. Pellets may also be used as an intermediate in the processing method.

The one-part closure devices of the invention, or the one-part closure devices produced by a process of the invention are suitable for sealing containers, in particular wine bottles or other bottles.

The present invention therefore also provides the use of a one-part closure device or of a one-part closure device produced by a process of the invention as a closure for containers, in particular as a closure for a wine bottle or other bottle.

Examples will be used below for further illustration of the present invention.

EXAMPLES

Example 1

Production of a Closure Device of the Invention by the Plastisol Process 100 g of Vestolit P 1351 K emulsion PVC, 60 g of a diisononyl cyclohexane-1,2-dicarboxylate obtainable by hydrogenating a diisononyl phthalate with CAS No. 28553-12-0, as plasticizer, 3 g of Porofor ADC-F, and 3 g of Birostab KK 1071 Na/Zn stabilizer/kicker are mixed with a spatula at room temperature. The mixture is then homogenized on a water-cooled 3-roll mill. The resultant homogeneous plastisol is deaerated in a dessicator and, following collapse, exposed for 10 minutes to a vacuum of 15 mm Hg. The plastisol is then cast into the preheated mold, gelled, cooled, and demolded.

Example 2

Production of a Closure Device of the Invention by Thermoplastic Processing Methods 100 g of Solvin 271 PC suspension PVC, 60 g of a diisononyl cyclohexane-1,2-dicarboxylate obtainable by hydrogenating a diisononyl phthalate with CAS No. 28553-12-0, as plasticizer, 3 g of Porofor ADC-F, and 3 g of Birostab KK 1071 Na/Zn stabilizer/kicker are mixed in a fluid mixer until the discharge temperature is about 120° C. The resultant dry blend is extruded through an extruder whose die has the external diameter of the desired cork, to give an extrudate. The resultant extrudate is cooled in a water bath and then cut to give pieces of the length required for corks.

We claim:
1. A one-part screw closure or stopper adapted as a closure for a bottle encompassing at least polyvinyl chloride and at least one plasticizer, wherein the plasticizer is a substituted or unsubstituted cyclohexanedicarboxylic acid or a derivative thereof providing variable permeability.

2. A one-part screw closure or stopper as claimed in claim 1, wherein the cyclohexanedicarboxylic acid or the derivative thereof is selected from the group consisting of ring-hydrogenated mono- and dialkyl esters of phthalic acid, isophthalic acid, and terephthalic acid, ring-hydrogenation mono-, di-, and trialkyl esters of trimellitic acid, of trimesic acid, and of hemimellitic acid, and mono-, di-, and tri-, and tetraalkyl esters of pyromellitic acid, where the alkyl groups may be linear or branched and each may have from 1 to 30 carbon atoms, ring-hydrogenated anhydrides of phthalic acid, trimellitic acid, trimesic acid, or hemimellitic acid, and pyromellitic dianhydride, and mixtures of two or more of these.

3. A one-part screw closure or stopper as claimed in claim 1, wherein the at least one cyclohexane polycarboxylic acid or the derivative thereof is selected from the group consisting of:
mixed esters of cyclohexane-1,2-dicarboxylic acid with $C_1$-$C_{13}$ alcohols;
monoesters of cyclohexane-1,2-dicarboxylic acid with $C_1$-$C_{13}$ alcohols;
diisopentyl cyclohexane-1,2-dicarboxylate obtainable by hydrogenating diisopentyl phthalate with the Chemical Abstracts Registry Number (hereinafter: CAS No.) 84777-06-0;
diisoheptyl cyclohexane-1,2-dicarboxylate obtainable by hydrogenating diisoheptyl phthalate with the CAS No. 71888-89-6;
diisononyl cyclohexane-1,2-dicarboxylate obtainable by hydrogenating a diisononyl phthalate with the CAS No. 68515-48-0;
diisononyl cyclohexane-1,2-dicarboxylate obtainable by hydrogenating a diisononyl phthalate with the CAS No. 28553-12-0, based on n-butane;
diisononyl cyclohexane-1,2-dicarboxylate obtainable by hydrogenating a diisononyl phthalate with the CAS No. 28553-12-0, based on isobutene;
a di-$C_9$ cyclohexane-1,2-dicarboxylate obtainable by hydrogenating a dinonyl phthalate with the CAS No. 68515-46-8;
a diisodecyl cyclohexane-1,2-dicarboxylate obtainable by hydrogenating a diisodecyl phthalate with the CAS No. 68515-49-1;
a di-$C_{7-11}$ cyclohexane-1,2-dicarboxylate obtainable by hydrogenating the appropriate phthalate with the CAS No. 68515-42-4;
a di-$C_{7-11}$ cyclohexane-1,2-dicarboxylate obtainable by hydrogenating the di-$C_{7-11}$ phthalates with the following CAS Nos.
111 381-89-6,
111 381 90-9,
111 381 91-0,
68515-44-6,
68515-45-7 and
3648-20-7;
a di-$C_{9-11}$ cyclohexane-1,2-dicarboxylate obtainable by hydrogenating a di $C_{9-11}$ phthalate with the CAS No. 98515-43-5;
a diisodecyl cyclohexane-1,2-dicarboxylate obtainable by hydrogenating a diisodecyl phthalate composed mainly of di-2-propylheptyl phthalate;
a di-$C_{7-9}$ cyclohexane-1,2-dicarboxylate obtainable by hydrogenating the appropriate phthalate which has branched-chain or linear $C_{7-9}$-alkylester groups; examples of phthalates which can be used as appropriate starting material have the following CAS Nos:
di-$C_{7,9}$-alkyl phthalate with the CAS No. 111 381-89-6;
di-C7-alkyl phthalate with CAS No. 68515-44-6; and
di-C9-alkyl phthalate with the CAS No. 68515-45-7;
hydrogenation products of mixed phthalates with $C_{10}$ and $C_{13}$ alcohols;
the hydrogenation products of the commercially available benzene carboxylates CAS No. 68515-48-0, CAS No. 68515-49-1, CAS No. 28553-12-0, CAS No. 3319-31-1, CAS No. 28553-12-0, CAS No. 68515-50-4, CAS No. 27554-26-3, CAS No. 68515-47-9, CAS No. 85507-79-5, CAS No. 68515-47-9, CAS No. 68515-

45-7, CAS No. 68515-43-5, CAS No. 3648-20-2, CAS No. 90193-91-2, di-n-C8-C10-alkyl phthalate, CAS No. 85-68-7, CAS No. 90193-92-3, CAS No. 27253-26-5, CAS No. 68515-51-5, CAS No. 68648-93-1, CAS No. 70693-30-0, CAS No. 117-81-7, CAS No. 68515-42-4, CAS No. 68515-43-5, CAS No. 3648-20-2, CAS No. 26761-40-0and CAS No. 84777-06-0, where the at least one cyclohexane polycarboxylic acid or the derivative thereof may be present in the form of cis-isomer or trans-isomer, or in the form of a mixture of cis- and trans-isomer.

4. A one-part screw closure or stopper as claimed in claim 1, wherein the cyclohexane dicarboxylic ester is diisononyl cyclohexane-1,2-dicarboxylate obtainable by hydrogenating a diisononyl phthalate with the CAS number 28553-12-0.

5. A one-part screw closure or stopper as claimed in claim 1, which is a closure stopper.

6. A process for producing a one-part screw closure or stopper, encompassing at least polyvinyl chloride and at least one cyclohexanedicarboxylic acid or a derivative thereof providing variable permeability, which comprises bringing the components into contact with one another.

7. A process as claimed in claim 6, wherein the components are processed by a plastisol process.

8. The one-part screw closure or stopper as claimed in claim 1, wherein the plasticizer is a substituted or unsubstituted cyclohexanedicarboxylic acid or an ester or anhydride thereof providing variable permeability.

9. A one-part screw closure or stopper as claimed in claim 1, wherein the content of plasticizer in the closure device is from 1 to 80% by weight.

10. A one-part screw closure or stopper as claimed in claim 1, wherein the content of plasticizer in the closure device is from 10 to 50% by weight.

11. A one-part screw closure or stopper as claimed in claim 1, wherein the content of plasticizer in the closure device is from 15 to 45% by weight.

12. A one-part screw closure or stopper as claimed in claim 1, wherein the plasticizer is a mixture of cis- and trans-isomer of a cyclohexane polycarboxylic acid or of a derivative thereof, and the cis:trans-isomer ratio is from 0:100 to 100:0.

13. A one-part screw closure or stopper as claimed in claim 1, wherein the plasticizer is a mixture of cis- and trans-isomer of a cyclohexane polycarboxylic acid or of a derivative thereof, and the cis:trans-isomer ratio is from 70:30 to 99:1.

14. A one-part screw closure or stopper as claimed in claim 1, wherein the plasticizer is 1,2-cyclohexane dicarboxylic acid diisononyl ester.

15. The one-part screw closure as claimed in claim 1, wherein the PVC has a K value, determined to DN 53726, from 57 to 90.

16. A one-part screw closure or stopper as claimed in claim 1, wherein the content of PVC in the closure device is from 20 to 99%.

17. A one-part screw closure or stopper as claimed in claim 1, wherein the content of PVC in the closure device is from 45 to 95%.

18. A one-part screw closure or stopper as claimed in claim 1, wherein the closure device or stopper comprises other suitable additives, selected from the group consisting of stabilizers, lubricants, fillers, pigments, flame retardants, light stabilizers, blowing agents, polymeric processing aids, impact modifiers, optical brighteners, antistats and biostabilizers.

* * * * *

UNITED STATES PATENT AND TRADEMARK OFFICE
CERTIFICATE OF CORRECTION

PATENT NO. : 7,337,913 B2  Page 1 of 1
APPLICATION NO. : 10/502710
DATED : March 4, 2008
INVENTOR(S) : Breitscheidel et al.

It is certified that error appears in the above-identified patent and that said Letters Patent is hereby corrected as shown below:

In claim 3, column 35, line 7: "CAS No. 26762-40-0and" should read
--CAS No. 26762-40-0 and--

Signed and Sealed this

Eighth Day of July, 2008

JON W. DUDAS
*Director of the United States Patent and Trademark Office*